United States Patent
Gupta

(10) Patent No.: US 8,433,005 B2
(45) Date of Patent: Apr. 30, 2013

(54) FRAME SYNCHRONIZATION AND INITIAL SYMBOL TIMING ACQUISITION SYSTEM AND METHOD

(75) Inventor: Alok Kumar Gupta, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 1268 days.

(21) Appl. No.: 11/020,413

(22) Filed: Dec. 22, 2004

(65) Prior Publication Data

US 2005/0163262 A1 Jul. 28, 2005

Related U.S. Application Data

(60) Provisional application No. 60/540,089, filed on Jan. 28, 2004.

(51) Int. Cl.
*H04L 27/06* (2006.01)
*H04L 7/04* (2006.01)
*H04J 3/06* (2006.01)

(52) U.S. Cl.
USPC ............ 375/343; 375/340; 375/362; 370/509

(58) Field of Classification Search ................. 375/343, 375/259, 260, 355, 344, 371, 316, 340, 362–366, 375/373, 375, 376; 370/208, 210, 503, 509–514, 370/516, 517; 705/422–426
See application file for complete search history.

(56) References Cited

U.S. PATENT DOCUMENTS

| | | | |
|---|---|---|---|
| 4,607,257 A | * | 8/1986 | Noguchi ................... 340/12.22 |
| 5,732,113 A | | 3/1998 | Schmidl et al. |
| 6,069,915 A | | 5/2000 | Hulbert |
| 6,151,295 A | | 11/2000 | Ma et al. |
| 6,597,729 B1 | | 7/2003 | Schmidl et al. |
| 6,631,160 B2 | | 10/2003 | Piirainen et al. |

(Continued)

FOREIGN PATENT DOCUMENTS

| | | |
|---|---|---|
| CL | 2230-2204 | 9/2004 |
| CN | 1957551 A | 5/2007 |

(Continued)

OTHER PUBLICATIONS

International Search Report—PCT/US05/002542, International Search Authority—European Patent Office, Jun. 29, 2005.

(Continued)

*Primary Examiner* — Tesfaldet Bocure
(74) *Attorney, Agent, or Firm* — Fulbright & Jaworski L.L.P.

(57) ABSTRACT

A robust initial frame detection and symbol synchronization system and methodology are provided. In particular, a first pilot is employed in conjunction with three acquisition stages. In the first stage, an attempt is made to observe the leading edge of the correlation curve associated with the first pilot symbol. In the second stage, a determination is made as to whether a leading edge was detected in the first stage by attempting to observe a flat portion and/or trailing edge of the correlation curve. Furthermore, during this second stage, a frequency loop can be updated to account for frequency offset. The third stage is for observing the trailing edge of the curve if it was not already observed in stage two. Upon detection and confirmation of receipt of the first pilot, a second pilot can subsequently be employed to acquire fine symbol timing.

103 Claims, 22 Drawing Sheets

U.S. PATENT DOCUMENTS

| | | |
|---|---|---|
| 6,925,112 B1 | 8/2005 | Morejon et al. |
| 7,016,397 B1 | 3/2006 | Vihriala |
| 7,050,511 B2 | 5/2006 | Jeong |
| 7,068,593 B2 | 6/2006 | Cho et al. |
| 7,133,457 B2 | 11/2006 | Singh et al. |
| 7,218,691 B1 | 5/2007 | Narasimhan |
| 7,221,680 B2 | 5/2007 | Vijayan et al. |
| 7,236,554 B2 | 6/2007 | Gupta |
| 7,359,314 B2 | 4/2008 | Sakata et al. |
| 7,366,087 B2 | 4/2008 | Lee et al. |
| 7,424,067 B2 | 9/2008 | Vanderperren et al. |
| 2002/0181390 A1 | 12/2002 | Mody et al. |
| 2003/0117943 A1 | 6/2003 | Sakata et al. |
| 2004/0005018 A1 | 1/2004 | Zhu et al. |
| 2004/0223449 A1* | 11/2004 | Tsuie et al. .......... 370/204 |
| 2004/0252777 A1 | 12/2004 | Suh et al. |
| 2004/0257979 A1 | 12/2004 | Ro et al. |
| 2005/0063298 A1 | 3/2005 | Ling et al. |
| 2005/0163262 A1 | 7/2005 | Gupta |
| 2005/0163263 A1 | 7/2005 | Gupta et al. |
| 2006/0014494 A1 | 1/2006 | Vanderperren et al. |
| 2006/0176082 A1 | 8/2006 | Johnstone et al. |
| 2006/0209927 A1 | 9/2006 | Khandekar et al. |
| 2008/0291817 A1 | 11/2008 | Gupta |
| 2009/0190675 A1 | 7/2009 | Ling et al. |

FOREIGN PATENT DOCUMENTS

| | | |
|---|---|---|
| CN | 101032139 | 9/2007 |
| EP | 0959568 | 11/1999 |
| FR | 2830392 | 4/2003 |
| JP | 10-22973 | 1/1989 |
| JP | 07-321763 | 12/1995 |
| JP | 2000-115122 | 4/2000 |
| JP | 2000-138647 | 5/2000 |
| JP | 2000-332725 | 11/2000 |
| JP | 2000-341244 | 12/2000 |
| JP | 2001-069119 | 3/2001 |
| JP | 2001-103033 | 4/2001 |
| JP | 2001-156743 | 6/2001 |
| JP | 2002135226 | 5/2002 |
| JP | 2002-204214 | 7/2002 |
| JP | 2002-261728 | 9/2002 |
| JP | 2003-008676 | 1/2003 |
| JP | 2003502903 A | 1/2003 |
| JP | 2003-078959 | 2/2003 |
| JP | 2003-069546 | 3/2003 |
| JP | 2003115812 | 4/2003 |
| JP | 2003-143106 | 5/2003 |
| JP | 2003152674 | 5/2003 |
| JP | 2003-304219 | 10/2003 |
| JP | 2003348048 | 12/2003 |
| JP | 2004023340 | 1/2004 |
| JP | 2005-08-0240 | 3/2005 |
| JP | 2005506757 A | 3/2005 |
| JP | 3654185 | 6/2005 |
| JP | 2006-504359 | 2/2006 |
| JP | 2006-507753 | 3/2006 |
| JP | 2006174472 A | 6/2006 |
| JP | 2007514331 A | 5/2007 |
| JP | 2007-520931 | 7/2007 |
| JP | 2007-520167 | 1/2009 |
| JP | 2007-520168 | 1/2009 |
| KR | 101998-703715 | 12/1998 |
| KR | 1019990070745 | 9/1999 |
| KR | 102002-0056807 | 7/2002 |
| KR | 102003-0065083 | 8/2003 |
| KR | 102003-0097040 | 12/2003 |
| RU | 2111619 | 5/1998 |
| RU | 2157059 | 9/2000 |
| RU | 2180159 | 2/2002 |
| TW | I269546 B | 12/2006 |
| WO | 9800946 | 1/1998 |
| WO | 9959254 | 11/1999 |
| WO | 0065797 | 11/2000 |
| WO | 0077961 | 12/2000 |
| WO | 03028270 | 4/2003 |
| WO | 03034642 | 4/2003 |
| WO | 03035812 | 5/2003 |
| WO | 2004008706 | 1/2004 |
| WO | 2004049618 | 6/2004 |
| WO | 2005022797 | 3/2005 |

OTHER PUBLICATIONS

IEEE Std. 802.11a—1999; Part 11: Wireless LAN Medium Access Control (MAC) and Physical Layer (PHY) Specifications: High-speed Physical Layer in the 5 GHZ Band.

Van de Beek, et al., "ML Estimation of Time and Frequency Offset in OFDM Systems," IEEE Transactions on Signal Processing, vol. 45, No. 7, Jul. 1997.

Written Opinion, PCT/US2005/002542, International Searching Authority, European Patent Office, Jun. 29, 2005.

International Preliminary Report on Patentability, PCT/US2005/002542, International Preliminary Examining Authority, United States, Mar. 15, 2006.

Krystic et al., "Optimised low-power synchronizer design for the IEEE 802.11 standard", 2003 Proceedings, (ICASSP), vol. 2, Apr. 6-10, 2003, pp. 333-336.

Yun Chiu et al: "OFDM Receiver Design" December 2000, XP002263353.

Nee Van R, et al., "OFDM for Wireless Multimedia Communications. 5.2.1 Two-Dimensional Channel Estimators" OFDM Wireless Multimedia Communications; [Universal Personal Communications], Boston, MA: Artech House, US, Jan. 1, 2000, pp. 96-103.

Yang, et al., "Optimal Pilot Design for Multipath Channel Estimation of a Single Carrier Cyclic Prefix-Assisted CDMA System", Communication Systems, 2002. ICCS 2002,The 8th International Conference NCE on Nov. 25-28, 2002, Piscataway, NJ, USA, IEEE, vol. 1, Nov. 25, 2002, pp. 279-283.

Heiskalaand Terry, "OFDM Wireless LANs: A theoretical and Practical Guide", Sams Publishing, 2002.

\* cited by examiner

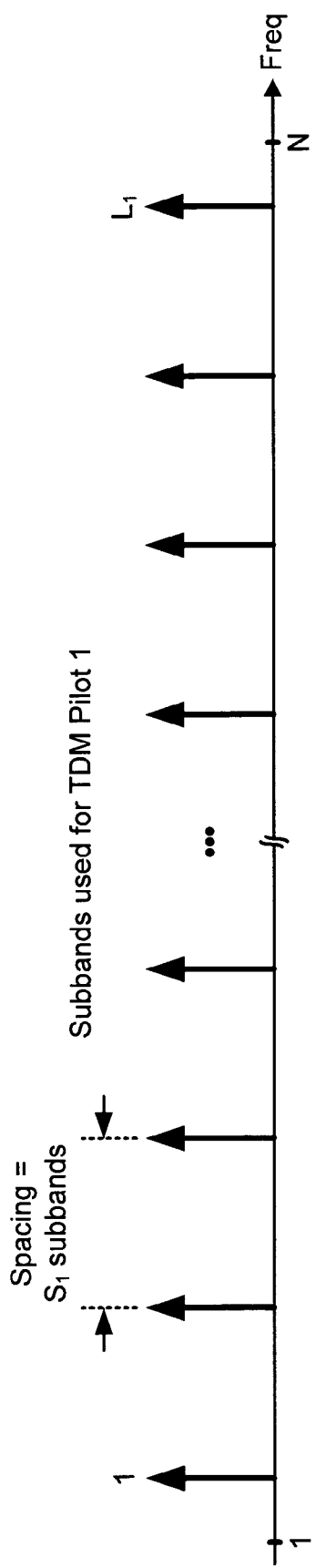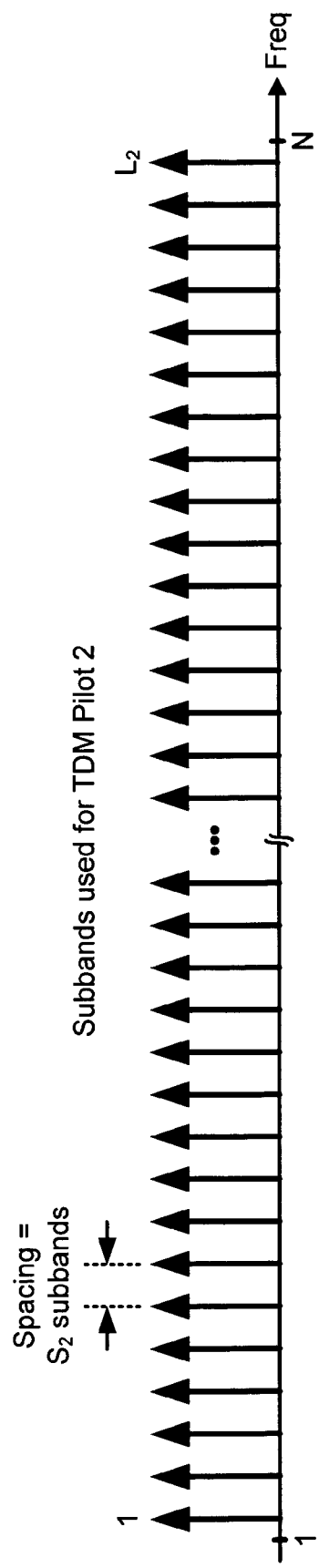

FRAME SYNCHRONIZATION AND INITIAL SYMBOL TIMING ACQUISITION SYSTEM AND METHOD

CROSS REFERENCE TO RELATED APPLICATIONS

This application claims the benefit of U.S. Provisional Application Ser. No. 60/540,089 entitled "A Procedure to Acquire Frame Synchronization and Initial OFDM Symbol Timing from the Detection of TDM Pilot," filed on Jan. 28, 2004. This application is also related to U.S. application Ser. No. 10/931,324 entitled "Synchronization in a Broadcast OFDM System using Time Division Multiplexed Pilots," filed on Aug. 3, 2004. The entireties of the aforementioned applications are incorporated herein by reference.

BACKGROUND

I. Field

The following description relates generally to data communication and more particularly toward signal acquisition and synchronization.

II. Background

There is an increasing demand for high capacity and reliable communication systems. Today, data traffic originates primarily from mobile telephones as well as desktop or portable computers. As time passes and technology evolves, it is foreseeable that there will be increased demand from other communication devices some of which have not been developed as of yet. For example, devices not currently thought of as communication devices such as appliances as well other consumer devices, will generate huge amounts of data for transmission. Furthermore, present day devices such as mobile phones and personal digital assistants (PDAs), among others, will not only be more prevalent but also demand unprecedented bandwidth to support large and complex interactive and multimedia applications.

While data traffic can be transmitted by way of wire, demand for wireless communication is currently and will continue to skyrocket. The increasing mobility of people of our society requires that technology associated therewith be portable as well. Thus, today many people utilize mobile phones and PDAs for voice and data transmission (e.g., mobile web, email, instant messaging . . . ). Additionally, growing numbers of people are constructing wireless home and office networks and further expecting wireless hotspots to enable Internet connectivity in schools, coffee houses, airports and other public places. Still further yet, there continues to be a large-scale movement toward integration of computer and communication technology in transportation vehicles such as cars, boats, planes, trains, etc. In essence, as computing and communication technologies continue to become more and more ubiquitous demand will continue to increase in the wireless realm in particular as it is often the most practical and convenient communication medium.

In general, the wireless communication process includes both a sender and a receiver. The sender modulates data on a carrier signal and subsequently transmits that carrier signal over a transmission medium (e.g., radio frequency). The receiver is then responsible for receiving the carrier signal over the transmission medium. More particularly, the receiver is tasked with synchronizing the received signal to determine the start of a signal, information contained by the signal, and whether or not the signal contains a message. However, synchronization is complicated by noise, interference and other factors. Despite such obstacles, the receiver must still detect or identify the signal and interpret the content to enable communication.

At present, there are many conventional spread frequency modulation technologies being employed. With these technologies, the power of a narrow band information signal is spread or enlarged across a large transmission frequency band. This spreading is advantageous at least because such transmissions are generally immune to system noise due to the small spectral power density. However, one known problem with such conventional systems is that multipath delay spread begets interference amongst a plurality of users.

One of the standards rapidly gaining commercial acceptance is orthogonal frequency division multiplexing (OFDM). OFDM is a parallel transmission communication scheme where a high-rate data stream is split over a large number of lower-rate streams and transmitted simultaneously over multiple sub-carriers spaced apart at particular frequencies or tones. The precise spacing of frequencies provides orthogonality between tones. Orthogonal frequencies minimize or eliminate crosstalk or interference amongst communication signals. In addition to high transmission rates, and resistance to interference, high spectral efficiency can be obtained as frequencies can overlap without mutual interference.

However, one problem with OFDM systems is that they are especially sensitive to receiver synchronization errors. This can cause degradation of system performance. In particular, the system can lose orthogonality amongst subcarriers and thus network users. To preserve orthogonality, the transmitter and the receiver must be synchronized. In sum, receiver synchronization is paramount to successful OFDM communications.

Accordingly, there is a need for a novel system and method of expeditious and reliable initial frame synchronization.

SUMMARY

The following presents a simplified summary in order to provide a basic understanding of some aspects and embodiments disclosed hereinafter. This summary is not an extensive overview nor is it intended to identify key/critical elements. Its sole purpose is to present some concepts or principles in a simplified form as a prelude to the more detailed description that is presented later.

Briefly described, various systems and methods to facilitate initial acquisition of frame, frequency and symbol timing are presented herein. The subject systems and methods acquire initial frame synchronization by detecting a first pilot symbol (e.g., a TDM pilot symbol within an OFDM environment). To facilitate pilot symbol detection, a delayed correlator can be employed. The delayed correlator receives a stream of input samples, correlates the input samples with delayed versions thereof, and generates a myriad of detection metrics or correlation outputs that can be used to detect the pilot symbol. When detection metrics or correlation values are observed over a period of time they produce what is referred to herein as a correlation curve including a leading edge, a flat zone, and a trailing edge, wherein the correlation curve is an energy distribution output by the delayed correlator. Detection of the first pilot symbol can be divided into three stages: detecting the leading edge of the correlation curve, confirming detection of the leading edge by detecting or observing a flat zone portion of the correlation curve, and finally detecting the trailing edge of the correlation curve.

In the first stage, an attempt is made to observe or detect the leading edge of a correlation curve. The magnitude of the correlator output or metric or some function thereof (e.g., output squared) is compared with a programmatic threshold. If the correlator output exceeds the threshold for a predetermined number of consecutive input samples (e.g., 64) the system or method can advance to the second stage.

In the second stage, an attempt is made to confirm detection of the leading edge and observe a flat zone of the correlation curve. Several counts or counters can be employed to facilitate this and other functionality. For instance, a first count can be incremented each time a new sample is received and correlated. A second count can be incremented each time the correlator output exceeds the same threshold. Still further yet, a third count can be employed to track the number of consecutive times the correlator output is below the threshold. These counters can then be utilized to determine, among other things, if a false leading edge was detected due to noise for example. If a false positive is detected a new leading edge will have to be located in stage one. If a false leading edge is not detected, the system or method remains in stage two for a predetermined period of time or until a consistent trailing edge is observed, for instance if the leading edge was detected late. Is should also be appreciated that at least one additional synchronization functionality can be provided for during this the second stage. In particular, a frequency loop accumulator (e.g., frequency locked loop, automatic frequency control loop . . . ) can be updated periodically to zero in on or detect a frequency offset. Furthermore, if the trailing edge of the pilot correlation curve is detected here, a time instance can be saved prior to detection thereof for use by a fine timing system or method.

Stage three pertains to detection of the trailing edge if it was not already observed in stage two. Here at least one counter can be employed to track the number of consecutive times the correlator output is less than the threshold. If the count value is greater than a predetermined or programmed value (e.g., 32), then the trailing edge has been detected. A time instance can also be saved corresponding to the time just prior to detection of the trailing edge. This time instance can then be utilized by the next wireless symbol (e.g., an OFDM symbol), which in one exemplary embodiment is a second TDM pilot. According to one particular embodiment, this time instance can correspond to the $256^{th}$ sample of the second pilot symbol. However, if the count is less than the programmable threshold or a consistent trailing edge is not observed during a time out period (e.g., 1024 input samples), then the system or method can reset counters and frequency accumulator and start searching for another leading edge in the first stage.

In one particular example, upon successful detection of the first TDM pilot-1, TDM pilot-2 can be employed to acquire fine OFDM symbol timing. Thereafter, an attempt is made to decode OFDM symbol data. The frequency loop can operate in a tracking mode after detection of the first TDM symbol. If the decoding of the OFDM symbol data fails then it is assumed that the frequency control loop failed to converge and the entire acquisition process is repeated with the next frame or super-frame.

In particular, a method is disclosed herein for initial frame detection and synchronization. First, a stream of input signals at least some being associated with a pilot symbol is received. Correlation outputs are generated forming a correlation curve from the signals and delayed copies thereof. A potential leading edge of the correlation curve is detected from the correlation outputs. Subsequently, the leading edge detection is confirmed and a trailing edge is detected from correlation outputs.

Similarly, a frame detection and synchronization system is disclosed herein comprising a delayed correlator component, a leading edge detection component, a confirmation component, and a trailing edge component. The delayed correlator component receives a stream of input samples, correlates the input samples with delayed versions thereof, and generates a plurality of outputs forming a correlation curve. The leading edge detection component receives the outputs compares the outputs with a threshold and generates a signal if it detects a potential leading edge of the correlation curve. The confirmation component compares additional outputs to the threshold to confirm leading edge detection upon receipt of a signal from the leading edge detection component. The trailing edge component receives receipt of a signal from the confirmation component and compares additional outputs to locate the trailing edge of the correlation curve.

To the accomplishment of the foregoing and related ends, certain illustrative aspects and embodiments are described herein in connection with the following description and the annexed drawings.

BRIEF DESCRIPTION OF THE DRAWINGS

The foregoing and other aspects will become apparent from the following detailed description and the appended drawings described in brief hereinafter.

FIG. 15a is diagram of an embodiment of a TDM pilot-1.

FIG. 15b is diagram of an embodiment of a TDM pilot-2.

DETAILED DESCRIPTION

Various aspects and embodiments are now described with reference to the annexed drawings, wherein like numerals refer to like or corresponding elements throughout. It should be understood, however, that the drawings and detailed description thereto are not intended to limit embodiments to the particular forms disclosed. Rather, the intention is to cover all modifications, equivalents, and alternatives.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer (e.g. desktop, portable, mini, palm . . . ). By way of illustration, both an application running on a computer device and the device itself can be a component. One or more components may reside within a process and/or thread of execution and a component may be localized on one computer and/or distributed between two or more computers.

Furthermore, aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN).

In accordance with the corresponding disclosure, various aspects are described in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Figure 1:
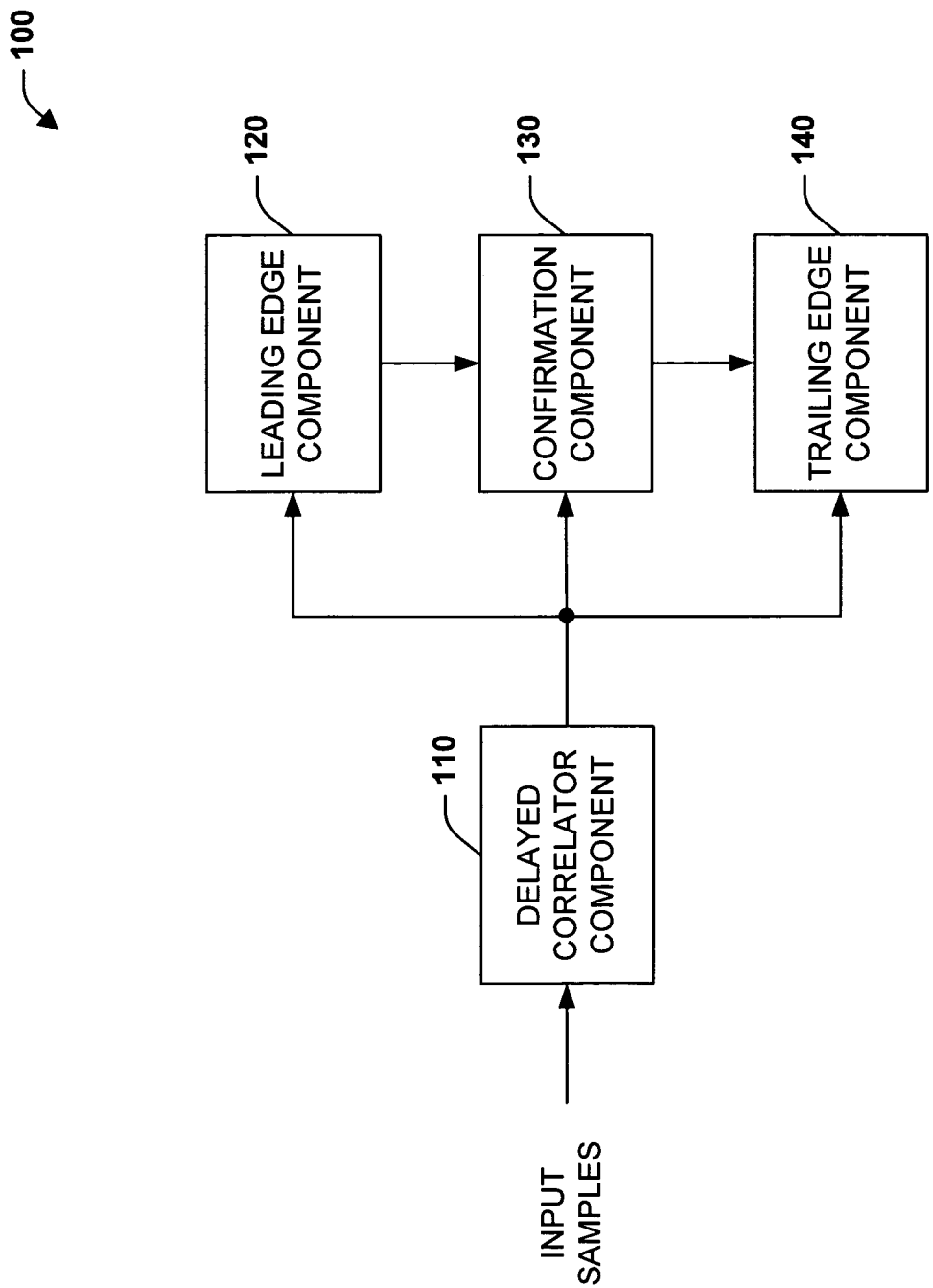
FIG. 1 is a block diagram of coarse frame detection system.

Turning initially to FIG. 1, frame detection system 100 is depicted. More specifically, system 100 is a receiver side sub-system associated with synchronization of wireless symbol transmissions (e.g., OFDM symbols). Synchronization refers generally to the process performed by a receiver to obtain both frame and symbol timing. As will be described in more detail in the sections that follow, frame detection is based on identification of pilot or training symbols transmitted at the start of a frame or super-frame. In one embodiment, the pilot symbols are time division multiplexed (TDM) pilots. In particular, a first pilot symbol can be employed for coarse estimation of a frame at a symbol boundary, inter alia, while a second pilot symbol can be utilized for to improve such estimation. System 100 is primarily concerned with detection of the first pilot symbol for frame detection, although it can be utilized in conjunction with the detection of other training symbols. System 100 includes delayed correlator component 110, leading edge detection component 120, confirmation component 130, and trailing edge detection component 130.

The delayed correlator component 110 receives a stream of digital input signals from a wireless device receiver (not shown). The delayed correlator component 110 processes the input signals and produces detection metrics or correlation outputs ($S_n$) associated therewith. A detection metric or correlation output is indicative of the energy associated with one pilot sequence. The computation mechanisms that generate detection metrics from streams of input signals will be presented in detail infra. Detection metrics are provided to a leading edge component 120, a confirmation component 130, and a trailing edge component 140 for further processing.

Figure 2A:
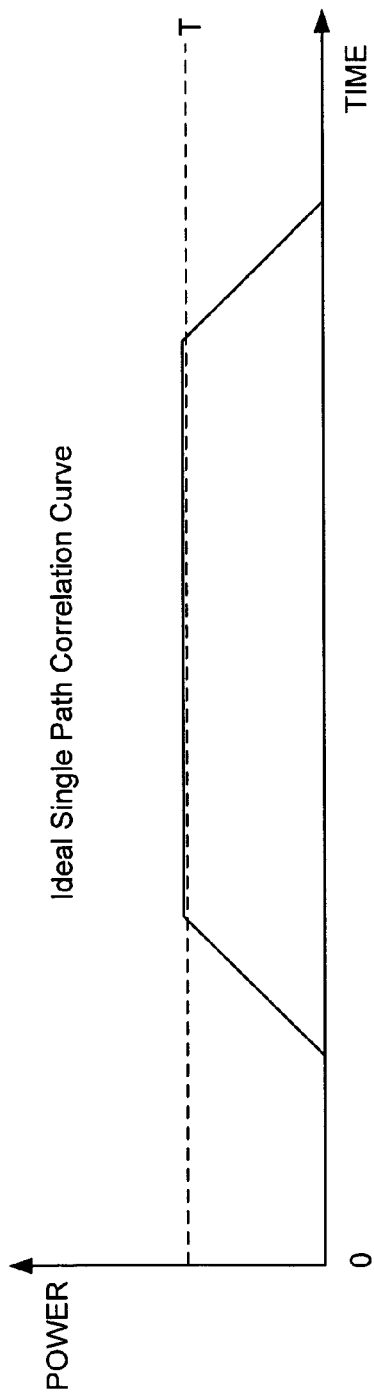
FIG. 2a is graph of a correlation curve in an ideal single path environment.
Figure 2B:
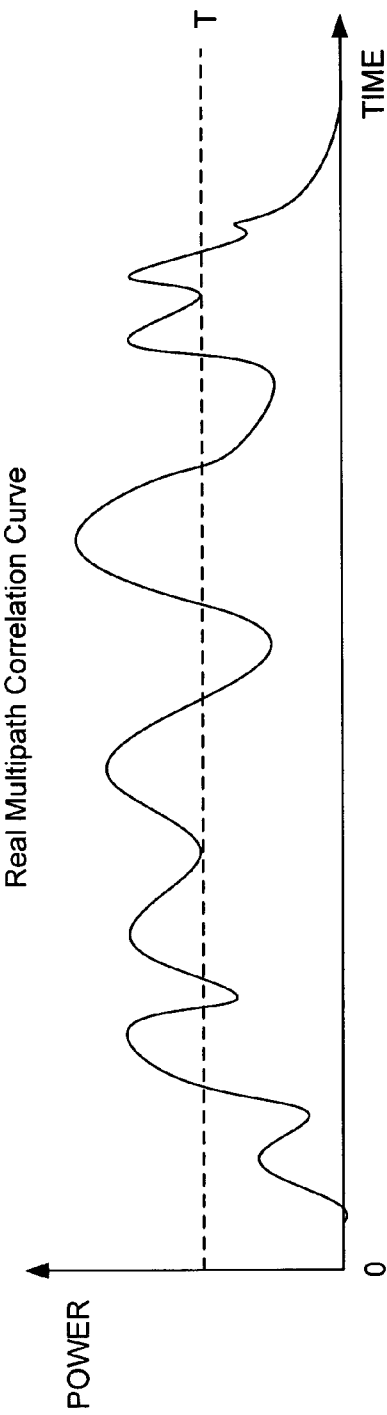
FIG. 2b is a graph of a correlation curve in a real multipath environment.

Turning briefly to FIGS. 2a and 2b, two exemplary diagrams illustrating pilot correlation outputs are provided for purposes of clarity as well as to facilitate appreciation of one of the problems identified and overcome. The correlation diagrams depict a correlator output as captured by the magnitude of the detection metric over time. FIG. 2a depicts correlator output in a channel without noise. The correlator output clearly has a leading edge, a flat portion, and subsequently a trailing edge. FIG. 2b illustrates an exemplary correlation curve in a channel subject to multipath effects (e.g., noise is resident upon the channel). One can observe that a pilot is existent, however it is obscured by channel noise and multipath delay. Conventionally, a single threshold is employed to detect a pilot symbol. In particular, the threshold is used to determine the start of a symbol when the correlation values are greater than the set or predetermined threshold. In the ideal case of FIG. 2a, the threshold would be set close to the flat zone value and a symbol would be detected when it crosses that value. Subsequently, a count would be initiated to determine the trailing edge. Alternatively, the trailing edge could simply be detected when the curve values dip below the threshold. Unfortunately, such conventional methods and techniques are not effective in a real multipath environment. As can be ascertained from FIG. 2b, the leading edge cannot readily be determined from the correlation values as multipath effects can cause the values to be spread and noise can further obscure the leading edge. This can result in a large number of false positive detections. Furthermore, the spreading of the signal is not conducive to counting samples to detect a trailing edge and noise will prohibit detection of a trailing edge when values dip below the threshold. The techniques disclosed herein provide a robust system and method of pilot and frame detection that is effective at least in a real world multipath environment.

Turning back to FIG. 1, leading edge component 120 can be employed to detect a potential leading edge of a correlation curve (e.g., where the correlation curve represents an energy distribution over time). Leading edge component 120 receives a series of detection metric values ($S_n$) from the delayed correlator component 120. Upon receipt, the value is compared to a fixed or programmable threshold (T). In particular, a determination is made as to whether $S_n \geq T$. If it is, then a count or counter (e.g., run count) is incremented. Alternatively, if $S_n < T$ then the counter can be set to zero. The counter thereby stores the number of consecutive correlation output values that are above the threshold. Leading edge component 120 monitors this counter to ensure that a predetermined or programmed number of samples have been analyzed. According to an embodiment, this can correspond to when the run count=64. However, it should be appreciated that this value can be modified to optimize detection in a particular system in a specific environment. This technique is advantageous in that it makes it less likely that a leading edge will be falsely detected as a result of initial noise or spreading, because the samples must consecutively stay above a threshold for a length of time. Once the condition(s) are satisfied, the leading edge component can declare detection of a potential leading edge. Subsequently, a signal can be provided to confirmation component 130 indicating such.

As the name suggests, confirmation component 130 is operable to confirm that a leading edge was indeed detected by the leading edge component 120. Following a leading edge, a lengthy flat period is expected. Hence, if the flat portion is detected then this increases the confidence that the leading edge of the pilot symbol was detected by the leading edge component 120. If not, then a new leading edge will need to be detected. Upon receipt of a signal from the leading edge component 120, the confirmation component 130 can begin to receive and analyze additional detection metric values ($S_n$).

Figure 3:
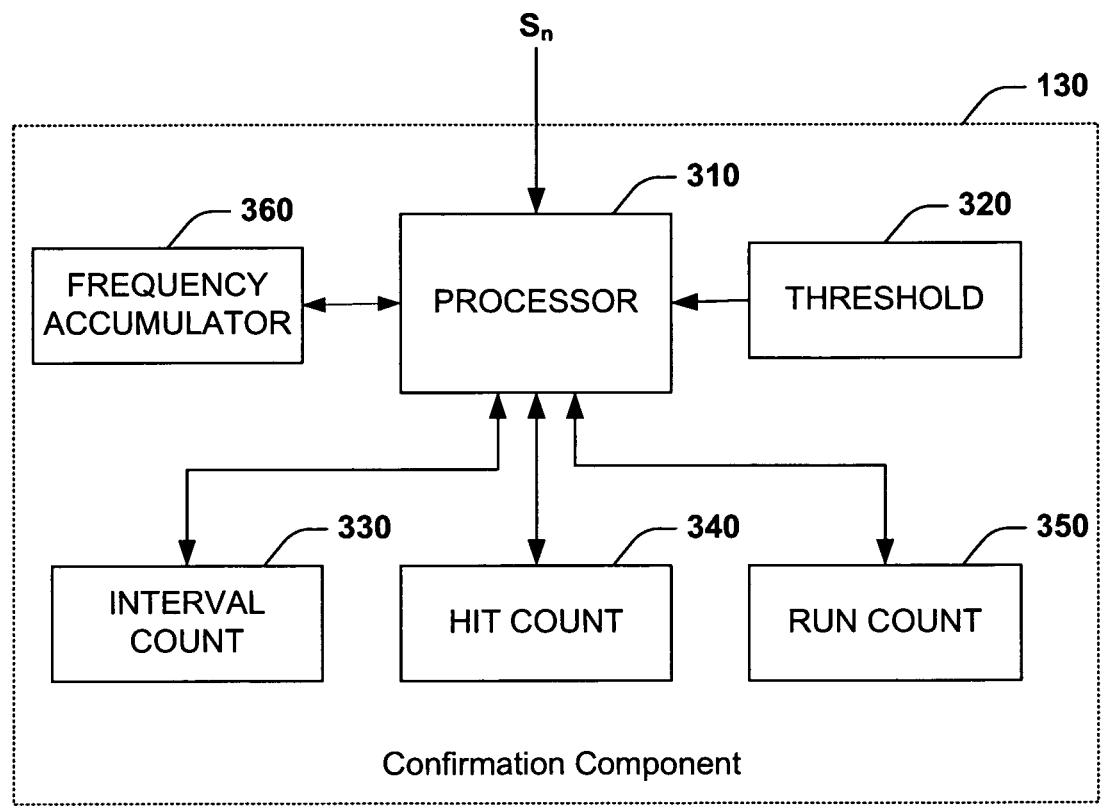
FIG. 3 is a block diagram of an embodiment of a confirmation component.

Turning to FIG. 3, a block diagram of one exemplary implementation of the confirmation component 130 is depicted to facilitate clarity in understanding. Confirmation component 130 can include or be associated with a processor 310, a threshold value 320, an interval count 330, a hit count 340, a run count 350, and a frequency accumulator 360. Processor 310 is communicatively coupled with threshold 320, interval counter 330, hit counter 340, run counter 350, and the frequency accumulator 360. Furthermore, processor 310 is operable to receive and/or retrieve correlation values $S_n$ as well as interact (e.g., receive and transmit signals) with leading edge component 120 (FIG. 1) and trailing edge component 140 (FIG. 1). The threshold value 320 can be the same threshold as was employed by the leading edge component 120 (FIG. 1). Furthermore, it should be noted that while the threshold value is illustrated as part of the confirmation component 130 as a hard coded value, for instance, the threshold value 320 can be received and/or retrieved from outside the component to, among other things, facilitate programming of such value. In brief, interval count 330 can be used in determining when to update a frequency locked loop to determine frequency offset employing frequency accumulator 360 as well as detecting the trailing edge. Hit count 340 can be utilized to detect the symbol flat zone and run count 350 is used to identify a trailing edge.

Prior to initial processing of correlation values, the processor 310 can initialize each of the counters 330, 340, and 350, as well as the frequency accumulator 360 to zero, for example. The processor 310 can then receive or retrieve a correlation output $S_n$ and the threshold 420. The interval count 430 can then be incremented to note that a new sample has been retrieved. Each time a new correlation sample is retrieved the interval count 430 can be incremented. The processor 310 can subsequently compare the correlation value to threshold 320. If $S_n$ is greater than or equal to the threshold, then the hit count can be incremented. As per the run count, it can be incremented if $S_n$ is less then the threshold 320, otherwise it is set to zero. Similar to the leading edge, run count thus can indicate the number of consecutive samples below threshold. The count values can be analyzed to determine whether a leading edge has been detected, there was a false positive, or the leading edge was otherwise missed (e.g., got in to late), among other things.

In one embodiment, the confirmation component 130 can determine that the leading edge component 120 detected a false leading edge by examining the run count and the hit count. Since the confirmation component should be detecting a flat zone of the correlation curve where the values are greater than or equal to the threshold, if the hit count is sufficiently low and the run count is greater than a set value or the hit count and the run count are substantially equal, then it can be determined that noise may have caused incorrect detection of a leading edge. In particular, it can be noted that the received correlation values are not consistent with what is expected. According to one embodiment, the determination that a false leading edge can be made when the run count is greater than or equal to 128 and the hit count is less than 400.

A determination can be made by the confirmation component 130 that the leading edge was missed or otherwise detected too late for proper timing by again comparing the values of the run count and the hit count. In particular, if the hit count and the run count are sufficiently large such a determination can be made. In one embodiment, this can be decided when the run count is greater than or equal to 786 and the hit count is greater than or equal to 400. Of course, and as with all specific values provided herein, the values can be optimized or adjusted for a particular frame structure and/or environment.

It should be appreciated that the confirmation component 130 can begin to detect the trailing edge of the curve while it is analyzing the flat zone to decide if a proper leading edge was detected. If the trailing edge is detected, the confirmation component can be successfully terminated. To detect the trailing edge, the interval count and the run count can be employed. As noted above, the interval count includes the number of input samples received and correlated. The length of the flat zone is known to be within a particular count. Hence, if after detecting a potential leading edge and receiving a proper number of flat zone samples there is some evidence of a trailing edge, then the confirmation component can declare detection of the trailing edge. The evidence of a trailing edge can be provided by the run count, which counts the number of consecutive times the correlation value is below the threshold. In one embodiment the confirmation component 130 can declare detection of the trailing edge when the interval count is greater than or equal to 34*128 (4352) and the run count is greater than zero.

If the confirmation component fails to detect any one of the above three conditions then it can simply continue to receive correlation values and update the counters. If one of the conditions is detected, the processor can provide one or more additional checks on the counters to increase the confidence that one of the conditions has actually occurred. In particular, the processor 310 can insist upon a minimum number of hits in the flat zone as that is what it expected to observe after the leading edge detection. For instance, the processor can test whether the hit count is greater than a set value such as 2000. According to one embodiment of a frame structure disclosed herein, the expected number of hits in the flat zone should be 34*128, which over 4,000. However, noise will temper the actual results so the gating value can be set somewhat below 4,000. If the additional conditions are met, the confirmation component 130 can provide a signal to the trailing edge component alternatively the confirmation component can signal the leading edge component to locate a new leading edge.

It should also be appreciated that the confirmation component 130 can also provide additional functionality such as saving time instances and updating frequencies. The subject frame detection system 100 of FIG. 1 is providing course detection of the frame and symbol boundaries. Accordingly, some fine-tuning will need to be performed at a later time to get more precise synchronization. Therefore, at least one time reference should be saved for use later by a fine timing system and/or method. According to one embodiment, every time the run count is equal to zero, a time instance can be saved as an estimate of the last time for the correlation curve flat zone or the time just prior to detecting the trailing edge. Furthermore, proper synchronization necessitates locking on the appropriate frequency. Hence, the processor 310 can update a frequency locked loop utilizing the frequency accumulator 360 at particular times such as when the input is periodic. According to one embodiment, the frequency locked loop can be updated every 128 input samples as tracked by the interval counter, for instance.

Returning to FIG. 1, trailing edge component 140 can be employed to detect the trailing edge if not detected by the confirmation component 130. In sum, trailing edge component 140 is operable to detect the trailing edge or simply time out such that another leading edge can be detected by leading edge component 120.

Figure 4:
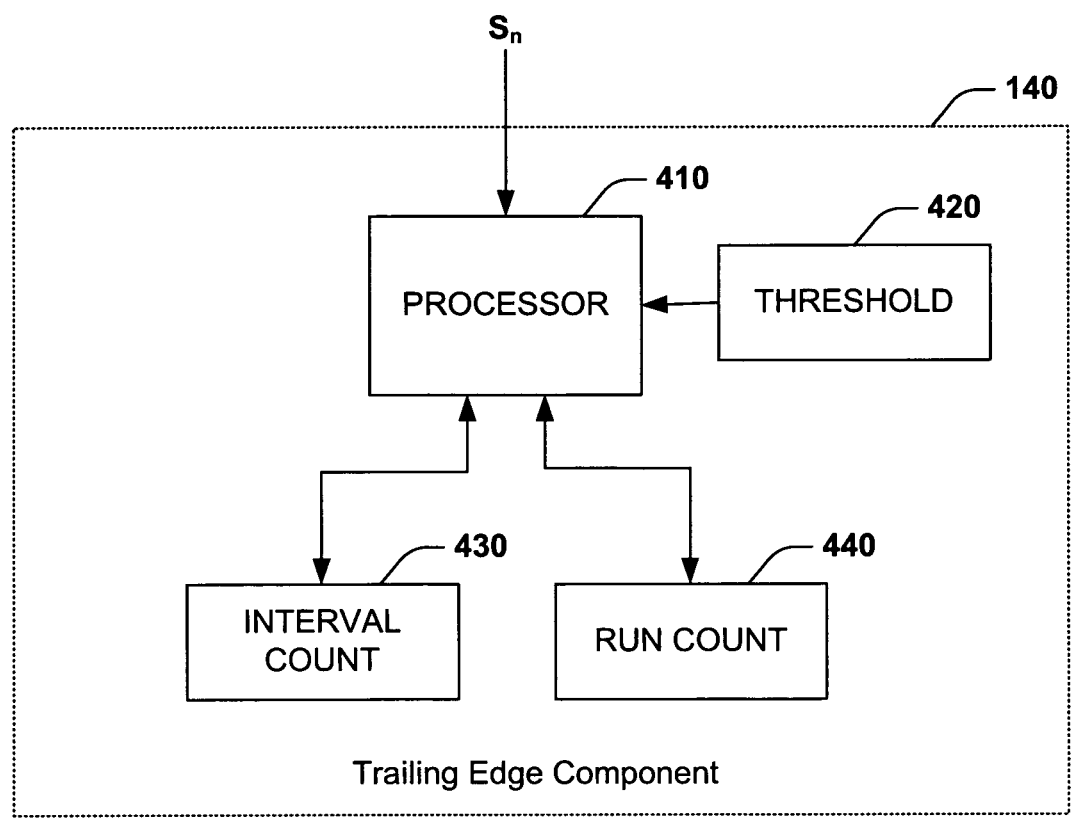
FIG. 4 is a block diagram of an embodiment of a trailing edge component.

Turning to FIG. 4 an embodiment of a trailing edge component 140 is illustrated. The trailing edge component 140 can include or be associated with processor 410, a threshold 420, an interval count 430 and a run count 440. Similar to the other detection components, trailing edge component 140 can receive a plurality of correlation values from the delayed correlator component 110 and increment appropriate counts to facilitate detection of a correlation curve trailing edge associated with a first pilot symbol (e.g., a TDM pilot symbol). In particular, processor 410 can compare the correlation value with the threshold 420 and populate either or both of the interval count 430 and the run count 440. It should be noted that although the threshold 420 is illustrated as part of the trailing edge component it could also be received or retrieved from outside the component such as from a central programmatic location. It should also be appreciated of course that processor 410 can, prior to its first comparison, initialize the interval count 430 and a run count 440 to zero. The interval count 430 stores the number of correlation outputs received. Thus, with each received or retrieved correlation value, the processor 410 can increment the interval count 430. The run count stores the consecutive number of times the correlation value or output is less than the threshold 420. If the correlation value is less than a threshold then the processor 410 can increment the run count 440, otherwise run count 440 can be set to zero. The trailing edge component 140 by way of processor 410, for example, can test whether an interval count value or a run count value has been satisfied utilizing the interval count 430 and or the run count 440. For instance, if the run count 440 attains a certain value the trailing edge component can declare detection of a trailing edge. If not, the trailing edge component 140 can continue to receive correlation values and update the counts. If, however, the interval count 430 becomes sufficiently large this can indicate that the trailing edge will not be detected and a new leading edge needs to be located. In one embodiment, this value can be 8*128 (1024). On the other hand, if the run count 440 hits or exceeds a value this can indicate that a trailing edge has been detected. According to an embodiment, this value can be 32.

Additionally, it should be appreciated that trailing edge component 140 can also save time instances for use in acquisition of fine timing. According to an embodiment, the trailing edge component 140 can save the time instance whenever the run count equals zero thereby providing a time instance just prior to trailing edge detection. According to one embodiment and the frame structure described infra, the saved time instance can correspond to the $256^{th}$ sample in the next OFDM symbol (TDM pilot-2). A fine frame detection system can subsequently improve upon that value as discussed in later sections.

Figure 5:
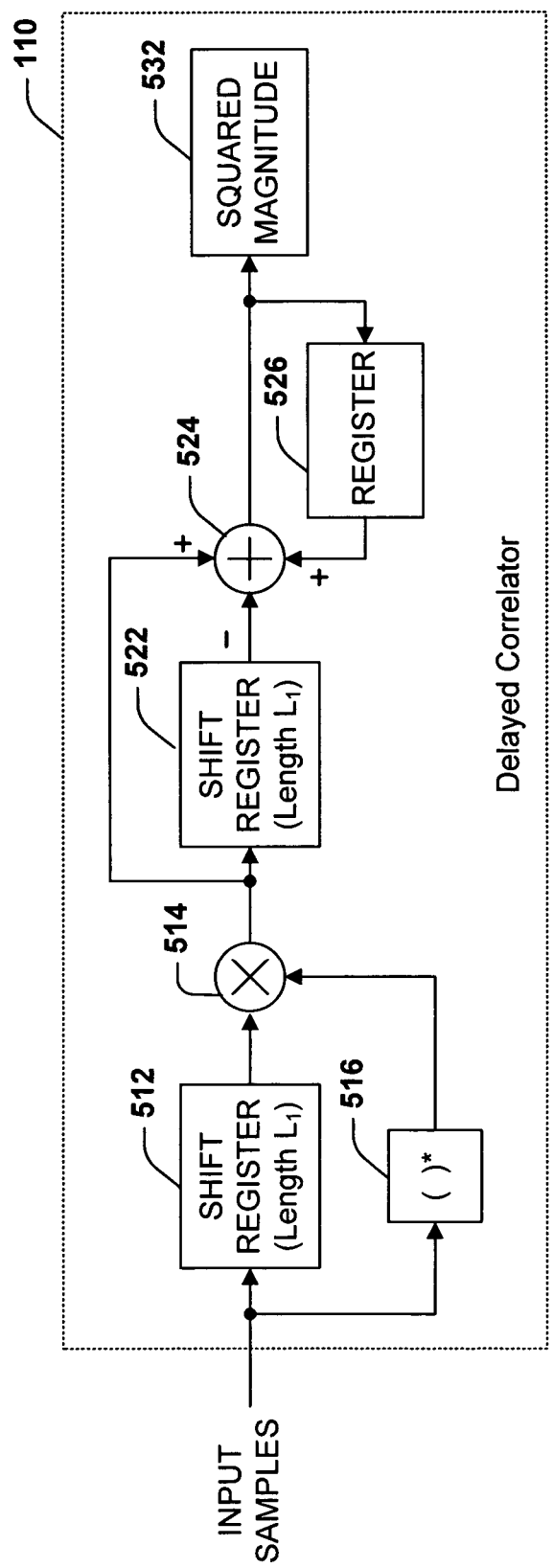
FIG. 5 is a block diagram of an embodiment of a delayed correlator component.

FIG. 5 illustrates a delayed correlator component 110 in further detail in accordance with one embodiment. The delayed correlator component 110 exploits the periodic nature of the pilot-1 OFDM symbol for frame detection. In an embodiment, correlator 110 uses the following detection metric to facilitate frame detection:

$$S_n = \left| \sum_{i=n-L_1+1}^{n} r_{i-L_1} \cdot r_i^* \right|^2, \quad \text{Eq (1)}$$

where
$S_n$ is the detection metric for sample period n;
"*" denotes a complex conjugate; and
$|x|^2$ denotes the squared magnitude of x.

Equation (1) computes a delayed correlation between two input samples $r_i$ and $r_{i-L_1}$ in two consecutive pilot-1 sequences, or $c_i = r_{i-L_1} \cdot r_i^*$. This delayed correlation removes the effect of the communication channel without requiring a channel gain estimate and further coherently combines the energy received by way of the communication channel. Equation (1) then accumulates the correlation results for all $L_1$ samples of a pilot-1 sequence to obtain an accumulated correlation result $C_n$, which is a complex value. Equation (1) then derives the decision metric or correlation output $S_n$ for sample period n as the squared magnitude of $C_n$. The decision metric $S_n$ is indicative of the energy of one received pilot-1 sequence of length $L_1$, if there is a match between the two sequences used for the delayed correlation.

Within delayed correlator component 110, a shift register 512 (of length $L_1$) receives, stores, and shifts the input samples $\{r_n\}$ and provides input samples $\{r_{n-L_1}\}$ that have been delayed by $L_1$ sample periods. A sample buffer may also be used in place of shift register 512. A unit 516 also receives the input samples and provides the complex-conjugated input samples $\{r_n^*\}$. For each sample period n, a multiplier 514 multiplies the delayed input sample $r_{n-L_1}$ from shift register 512 with the complex-conjugated input sample $r_n^*$ from unit 516 and provides a correlation result $c_n$ to a shift register 522 (of length $L_1$) and a summer 524. Lower-case $c_n$ denotes the correlation result for one input sample, and upper-case $C_n$ denotes the accumulated correlation result for $L_1$ input samples. Shift register 522 receives, stores, and delays the correlation results $\{c_{n-1}\}$ from multiplier 514 and provides correlation results $\{c_{n-L_1}\}$ that have been delayed by $L_1$ sample periods. For each sample period n, summer 524 receives and sums the output $C_{n-1}$ of a register 526 with the result $c_n$ from multiplier 514, further subtracts the delayed result $c_{n-L_1}$ from shift register 522, and provides its output $C_n$ to register 526. Summer 524 and register 526 form an accumulator that performs the summation operation in equation (1). Shift register 522 and summer 524 are also configured to perform a running or sliding summation of the $L_1$ most recent correlation results $c_n$ through $c_{n-L_1+1}$. This is achieved by summing the most recent correlation result $c_n$ from multiplier 514 and subtracting out the correlation result $c_{n-L_1}$ from $L_1$ sample periods earlier, which is provided by shift register 522. A unit 532 computes the squared magnitude of the accumulated output $C_n$ from summer 524 and provides the detection metric $S_n$.

Figure 6:
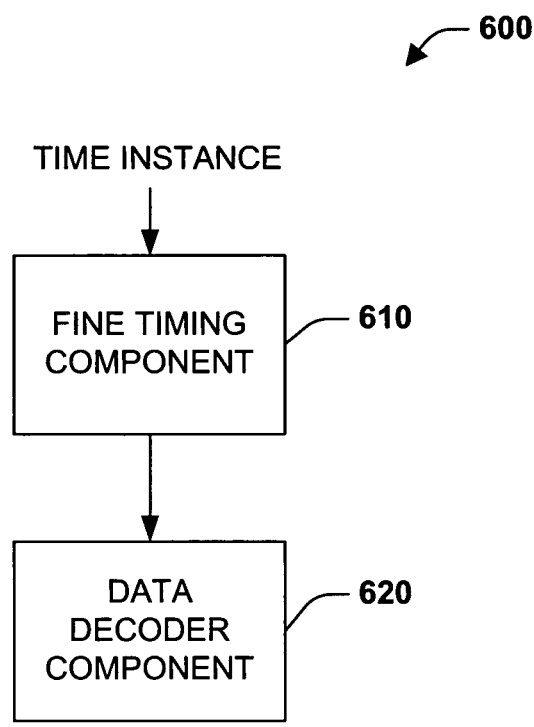
FIG. 6 is a block diagram of an embodiment of a fine frame detection system.

FIG. 6 depicts a fine frame detection system 600. System 600 includes a fine timing component 610 and a data decoder component 620. Fine timing component 610 can receive the time instance saved by the coarse frame detection system 100 (FIG. 1). As mentioned above, this time instance can correspond to the $256^{th}$ sample of the next OFDM symbol, which can be TDM pilot-2. This is somewhat arbitrary yet optimized for channels subject to multipath effects. The fine timing component 610 can then utilize the TDM pilot-2 symbol to improve upon this coarse timing estimate ($T_c$). There are many mechanisms to facilitate fine timing including those known in the art. According to one embodiment herein, a frequency-locked loop or automatic frequency control loop can be switched from acquisition to tracking mode, which utilizes a different algorithm to compute error and a different tracking loop bandwidth. Data decoder component 620 can attempt to decode one or more data OFDM symbols. This is an extra step providing for additional confidence that the synchronization has been accomplished. If the data does not decode, a new leading edge will have to be detected again by the leading edge component 120 (FIG. 1). Further detail concerning fine timing is provided infra.

In view of the exemplary systems described supra, methodologies that may be implemented will be better appreciated with reference to the flow charts of FIGS. 7-12. While for purposes of simplicity of explanation, the methodologies are shown and described as a series of blocks, it is to be understood and appreciated that the subject methodologies are not limited by the order of the blocks, as some blocks may occur in different orders and/or concurrently with other blocks from what is depicted and described herein. Moreover, not all illustrated blocks may be required to implement the provided methodologies.

Additionally, it should be further appreciated that the methodologies disclosed hereinafter and throughout this specification are capable of being stored on an article of manufacture to facilitate transporting and transferring such methodologies to computer devices. The term article of manufacture, as used, is intended to encompass a computer program accessible from any computer-readable device, carrier, or media.

Figure 7:
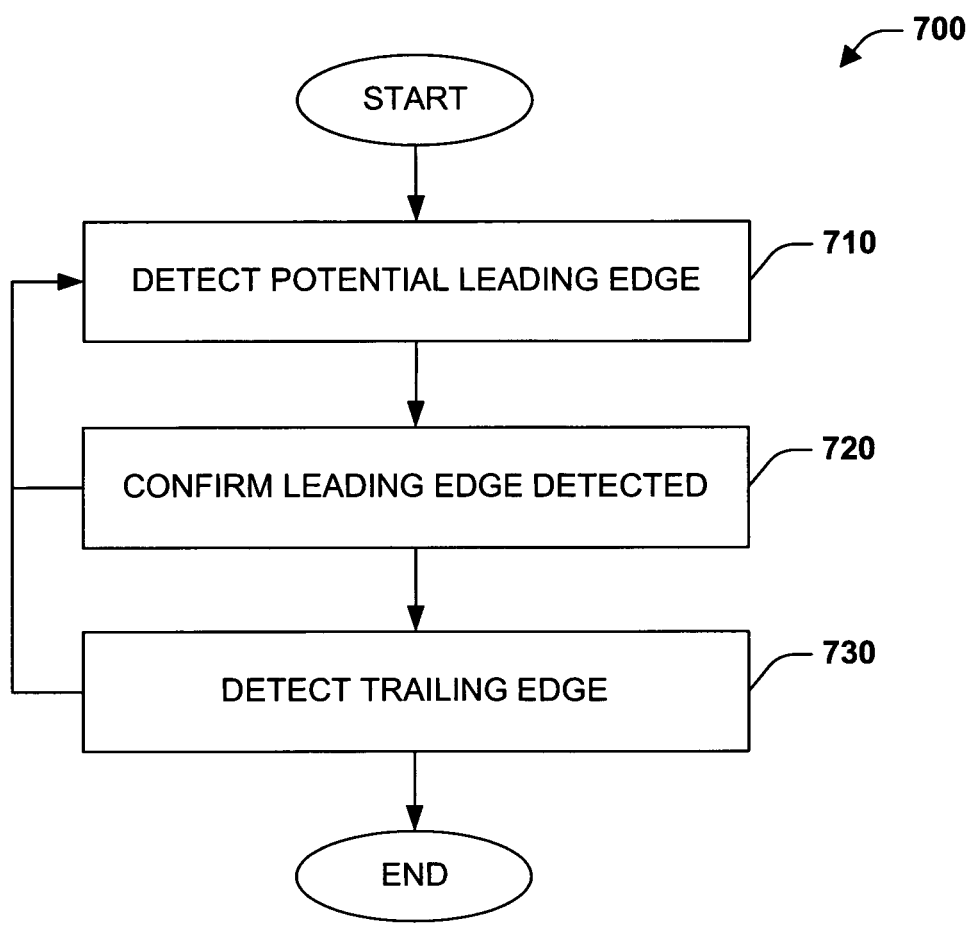
FIG. 7 is a flow chart diagram of an initial coarse frame detection methodology.

Turning to FIG. 7, a robust method of initial frame detection is illustrated. The method essentially contains three stages. At 710, the first stage, an attempt is made to observe a pilot symbol leading edge. The leading edge can be detected by analyzing a plurality of detection metrics or correlation output values produced by a delayed correlator. In particular, the detection metrics ($S_n$) or some function thereof (e.g., $S_n^2$ . . . ) can be compared with a threshold value. Potential detection of the leading edge can then be predicated on the number of times the metric is greater than or equal to the threshold. At 720, the detected leading edge is confirmed by observing additional correlation values and comparing them to the threshold. Here, the correlator output is again compared to the threshold and observations made regarding the number of times the correlator output exceeds the threshold. The process can stay in this stage for greater than or equal to a predetermined period of time (corresponding to the flat zone) or upon detection of a consistent trailing edge. It should also be noted that frequency offset can be obtained here be updating a frequency accumulator periodically. If neither of the confirmation conditions is met, then there was a false detection of a leading edge and the procedure can be initialized and started again at 710. At 730, an attempt is made to observe the trailing edge if not previously observed. If the correlator output remains below the threshold for a number of consecutive samples, for example 32, TDM pilot detection can be declared and initial frequency acquisition assumed to be complete. If this condition is not met then the process can be initialized and started again at 710. The initial OFDM symbol time estimate is based on the trailing edge. The time instance when the correlator output goes below the threshold for the first time during observation of the trailing edge can be views as an index (e.g., $256^{th}$ sample) into the next OFDM symbol, here, for example, TDM pilot-2.

Figure 8:
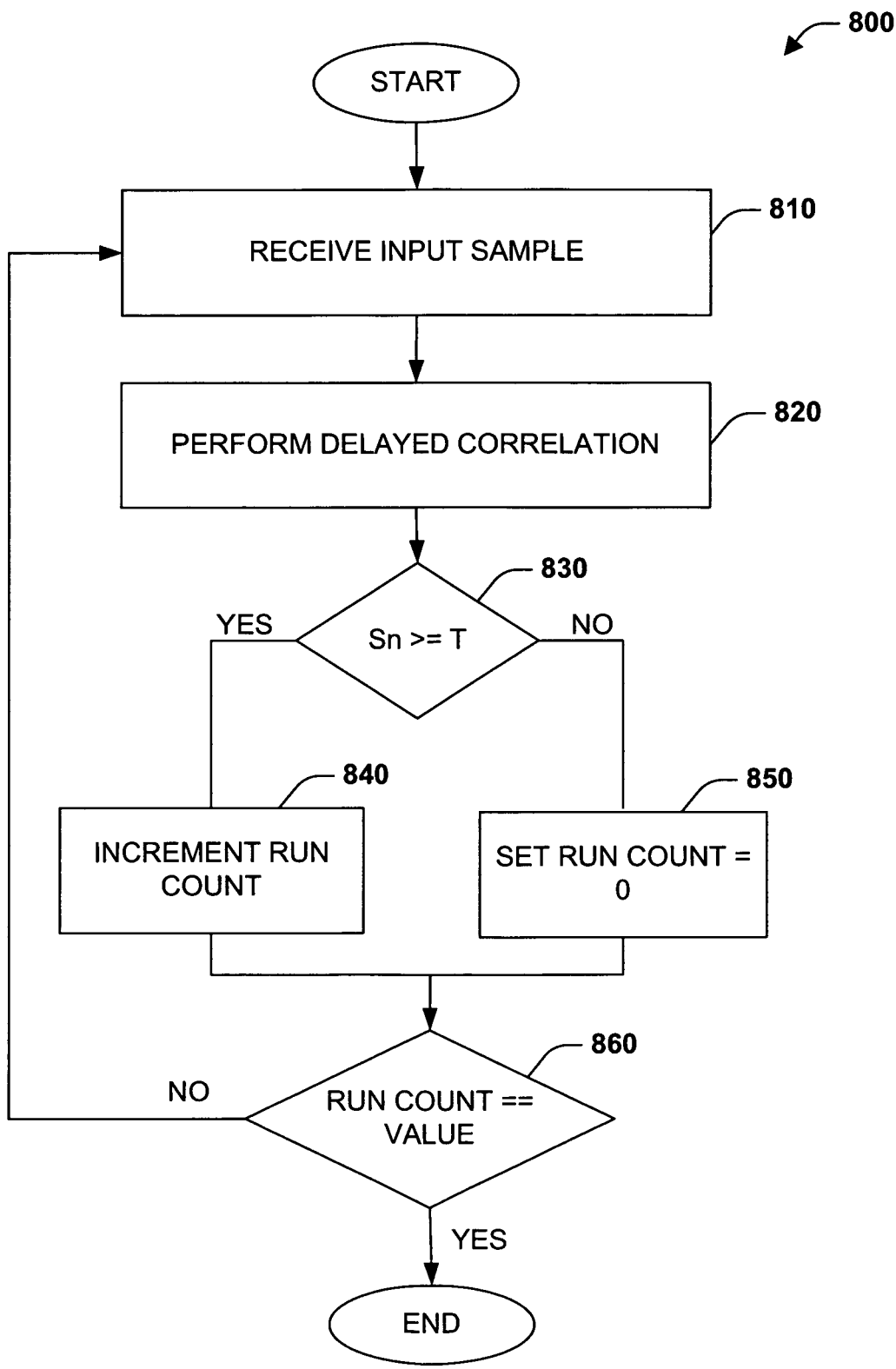
FIG. 8 is a flow chart diagram of a leading edge detection methodology.

FIG. 8 is a flow chart diagram depicting a leading edge detection methodology 800. At 810, transmitted input samples are received. A delayed correlation is performed, at 820, on the received input and a delayed version thereof. A correlation output is then provided to decision block 830. At 830, the correlation output is compared with a fixed or programmable threshold value. If the correlation value is greater than or equal to the threshold a run count or counter is incremented at 840. If the correlation value is less then the threshold value then the run count is set to zero, at 850. The run count is then compared, at 860, with a predetermined value that is optimized for detection of a leading edge in a multipath environment. In one embodiment, the value can be 64 input samples. If the run count is equal to the predetermined value the process is terminated. If the run count is not equal to the value then the additional input values are received at 810 and the process in repeated.

Figure 9:
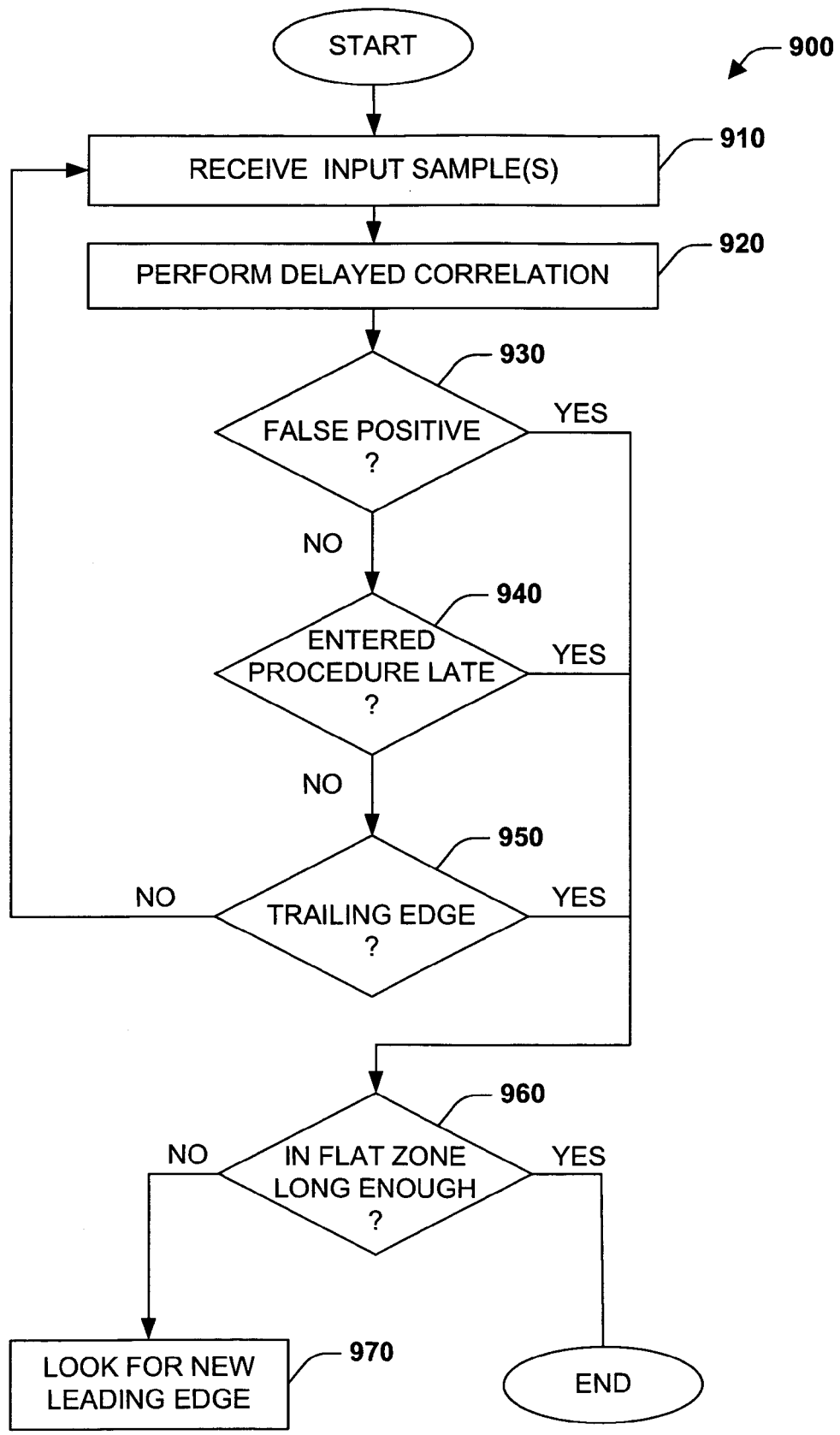
FIG. 9 is a flow chart diagram of a leading edge confirmation and flat zone detection methodology.

FIG. 9 is a flow chart diagram of leading edge confirmation methodology 900. Methodology 900 represents the second stage in a coarse or initial frame detection methodology, in which a leading edge detection is confirmed (or rejected) by way of detection of additional expected results, namely a flat zone and/or a trailing edge. At 910, one of a myriad of input samples is received. A delayed correlation is performed on the input sample and a delayed version thereof, at 920, to produce a correlation output. A plurality of correlator outputs are then analyzed with respect to a programmable threshold to make subsequent determinations. At 930, a determination is made as to whether a false leading edge was detected, which can result from channel noise, among other things. This determination can be made if not enough correlation output values are above a threshold. At 940, a determination is made as to whether a leading edge was detected too late. In other words, the leading edge was not detected until well into the flat zone region of the pilot. At 950, a determination is made as to whether a trailing edge is being observed. If none of these conditions are true based on the correlation outputs received thus far, the process continues at 910 where more input samples are received. If any one of the conditions is true, the process can continue at 960, were an additional determination is made concerning whether a long enough flat zone has been observed to provide confidence that it was detected. If yes, the procedure can be terminated. If no, the process can proceed with another method, such as method 800 (FIG. 8), to detect a new leading edge at 970. In one embodiment, a new pilot symbol will be transmitted one second after the previous pilot symbol.

Figure 10A:
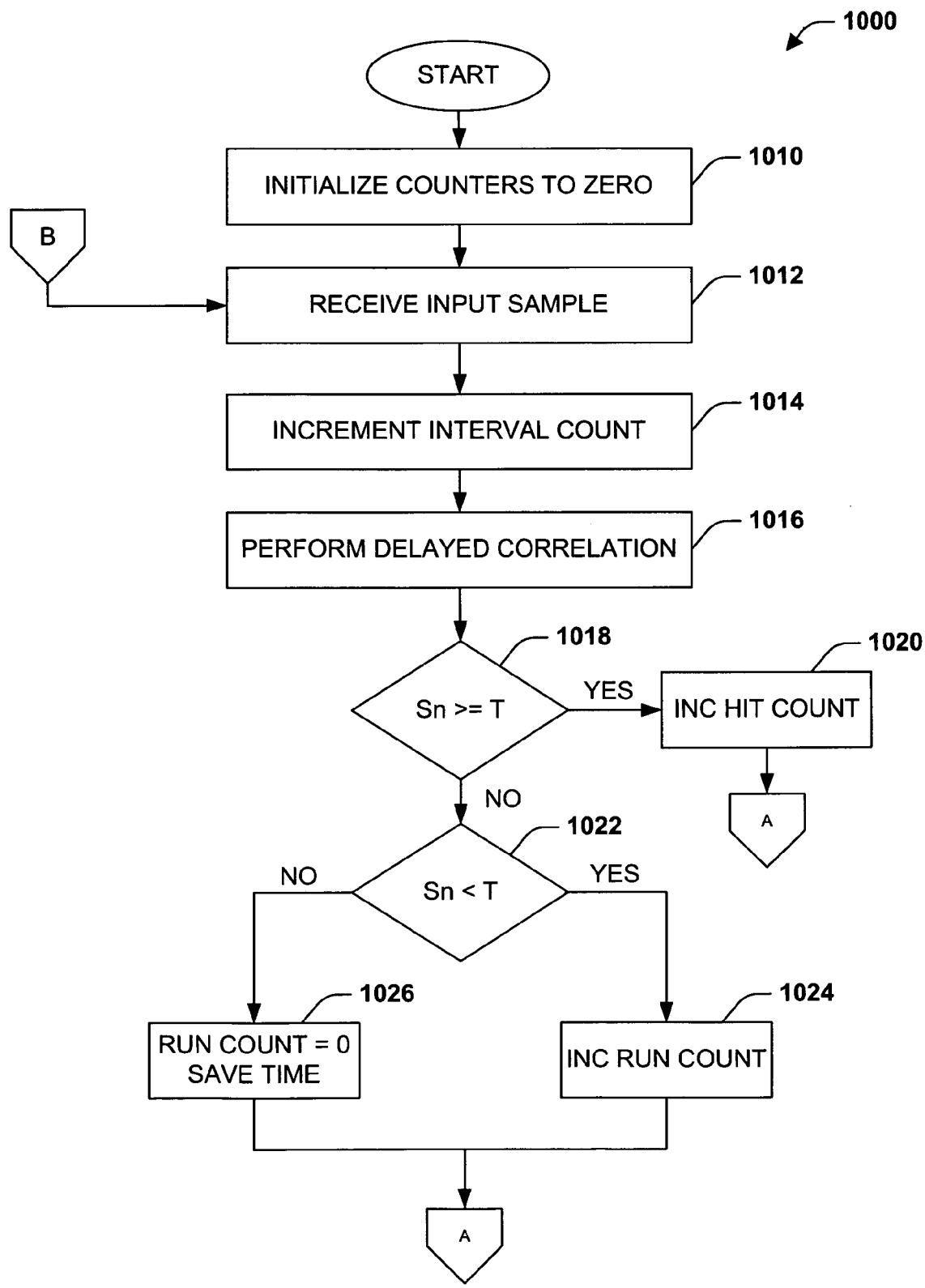
FIG. 10a is a flow chart diagram of a leading edge confirmation and flat zone detection methodology.
Figure 10B:
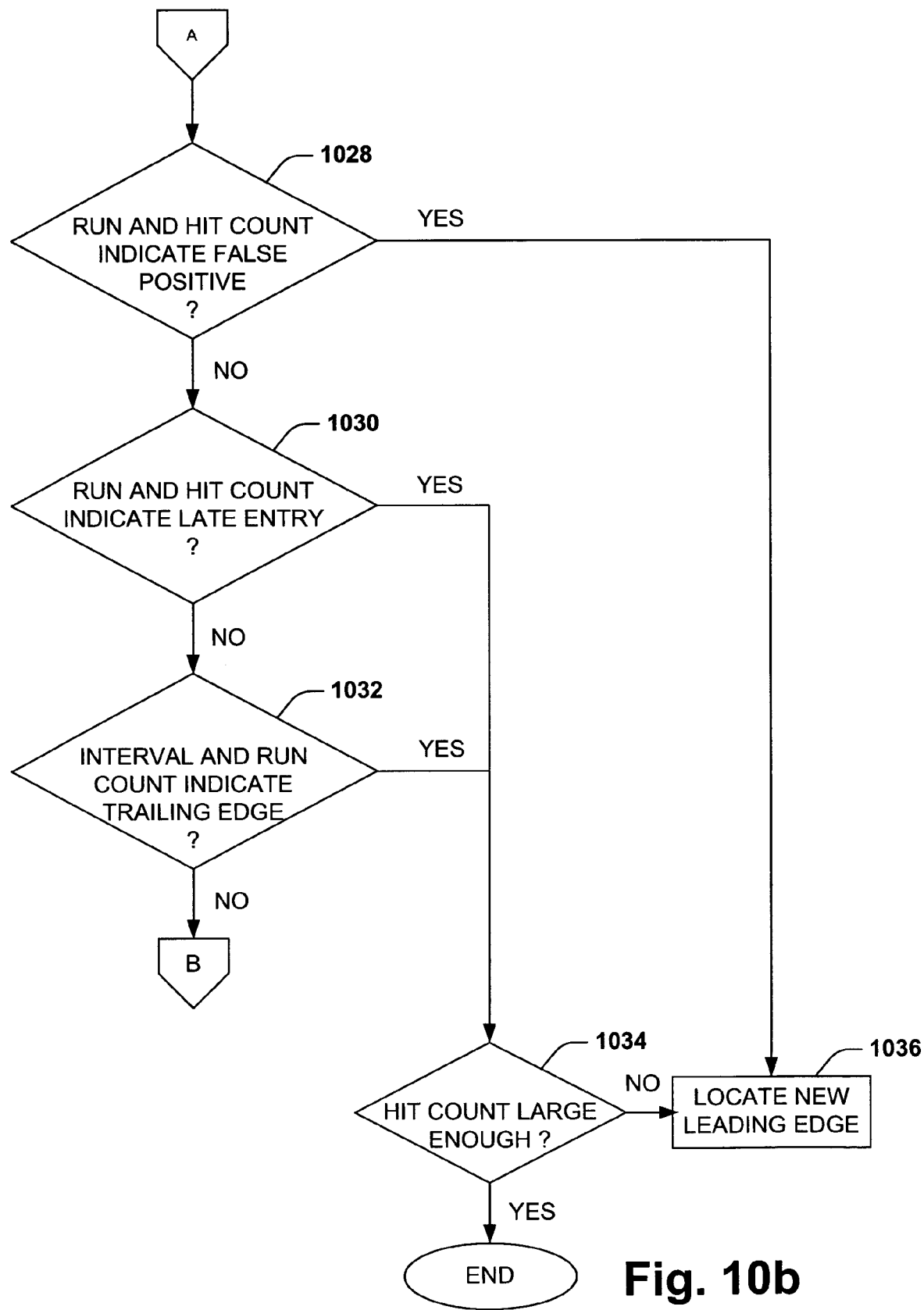
FIG. 10b is a flow chart diagram of a leading edge confirmation and flat zone detection methodology.

FIG. 10 depicts a more detailed method 1000 of detecting the flat zone and confirming detection of the leading edge in accordance with a particular embodiment. In this particular process, three counts or counters are employed: an interval count, a hit count, and a run count. At 1010, counters are all initialized to zero. At 1012, input samples are received. The interval count is incremented, at 1014, to indicate receipt of an input sample. It should also be appreciate that although not specifically denoted in the block diagram, a frequency loop can be updated every 128 samples as tracked by the interval count. At 1016, delayed correlation is performed utilizing the input sample and a time-delayed version thereof to produce a correlation output ($S_n$). A determination is then made, at 1018, as to whether $S_n$ is greater than or equal to a threshold (T). If $S_n <= T$, then the hit count is incremented at 1020 and the method can proceed at 1028. If not, then a determination is made at 1022 as to whether $S_n < T$. If yes, then the run count is incremented at 1024. If no, then the run count is initialized to zero and the time is saved at 1026. The saved time therefore provides the time instance prior to observation of a trailing edge. It should be appreciated that decision block 1022 is not strictly necessary here but is provided for clarity as well as to highlight further that the order of such method processes does not need to be fixed as shown. The method continues to 1028 where the hit count and the run count are scrutinized to determine if a false leading edge was detected. In one embodiment, this can correspond to the run count being greater than or equal to 128 and the hit count being less than 400. If it is decided that a false positive was detected the process proceeds to 1036 where a new leading edge is located. If a false positive was not able to be determined then the process continues at decision block 1030. At 1030, the run count and the hit count are analyzed to determine if the leading edge was detected late. According to one specific embodiment, this can correspond to when the run count is greater than or equal to 768 and the hit count is greater than or equal to 400. If this is the case, the process can continue at 1034. If the leading edge was not detected late, then the process proceeds to 1032 where the interval count and the run count are analyzed to determine if a trailing edge is being observed. In one embodiment this can be where the interval count is greater than or equal to the 4352 (34*128) and the run count is greater than zero. In other words, the full length of the flat zone has been detected and a dip below threshold has just been observed. If no, then all three conditions have failed and the process proceeds to 1012 where more input samples are received. If yes, a determination is made at 1034 as enough values have been observed above the threshold to enable the methodology to determine with confidence that the flat zone has been detected. More specifically, the hit count is larger than some programmable value. In one embodiment, the value can be 2000. However, this is some-what arbitrary. Ideally, the process should see 34 *128 (4352) samples above threshold, but noise can temper the count. Thus, the programmable value can set to an optimal level that provides a particular level of confidence that the flat zone has been detected. If the hit count is greater than the provided value, then the process terminates. If not, the process proceeds to 1036 where a new edge needs to be detected.

Figure 11:
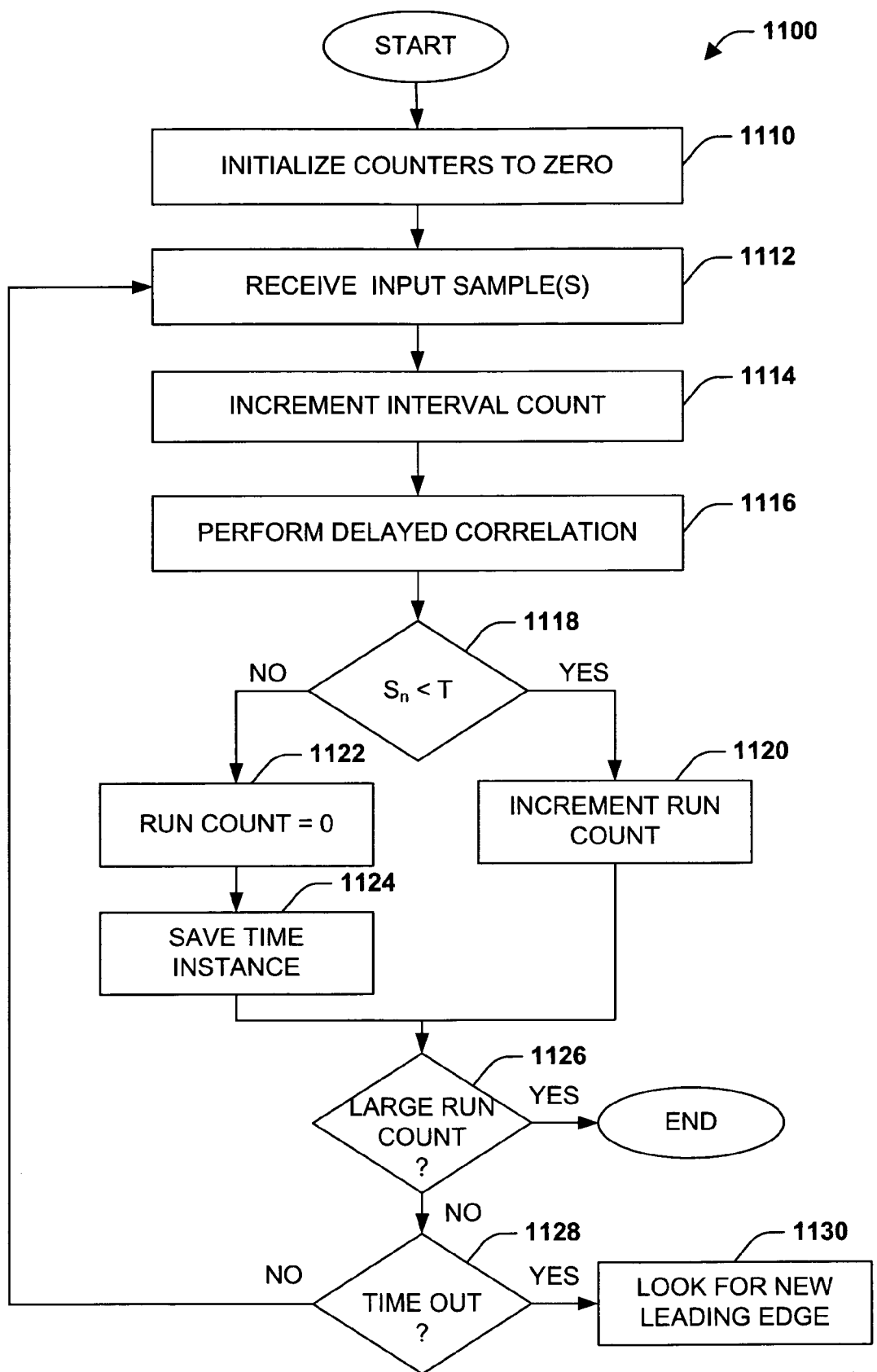
FIG. 11 is a flow chart diagram of a trailing edge detection methodology.

FIG. 11 illustrates one embodiment of a trailing edge detection methodology 1100. Trailing edge methodology can be employed to detect the trailing edge of correlation curve associated with a pilot symbol, if not previously detected. At 1110, counters including an interval and a run counter are initialized to zero. At 1112, input samples are received. The interval count is incremented corresponding to a received sample, at 1114. Each input sample is utilized by a delayed correlator to produce a correlation output $S_n$, at 1116. A decision is made at 1118 regarding with the correlation output $S_n$ is less than a programmable threshold (T). If $S_n < T$, then the run count is incremented at 1120 and the process proceeds to 1126. If the correlation output is not less than the threshold, then the run counter is set to zero at 1122 and the time instance can be saved at 1124. At 1126, a determination is made as to whether enough correlation outputs have been observed consecutively to confidently declare successful identification thereof. In one embodiment, this corresponds to a run time greater than or equal to 32. If the run time is large enough, the process can terminate successfully. If the run time is not large enough, the process proceeds to decision block 1128. At 1128, the interval counter can be employed to determine whether the detection method 1100 should be timed out. In one embodiment if the interval count is equal to 8* 128 (1024) the trailing edge detection method 1100 times out. If the method does not timeout at 1128, then additional samples can be received and analyzed starting again at 1112. If the method does time out at 1128, then the new pilot leading edge will need to be detected at 1130, as the method 1100 failed to observe a trailing edge.

Figure 12:
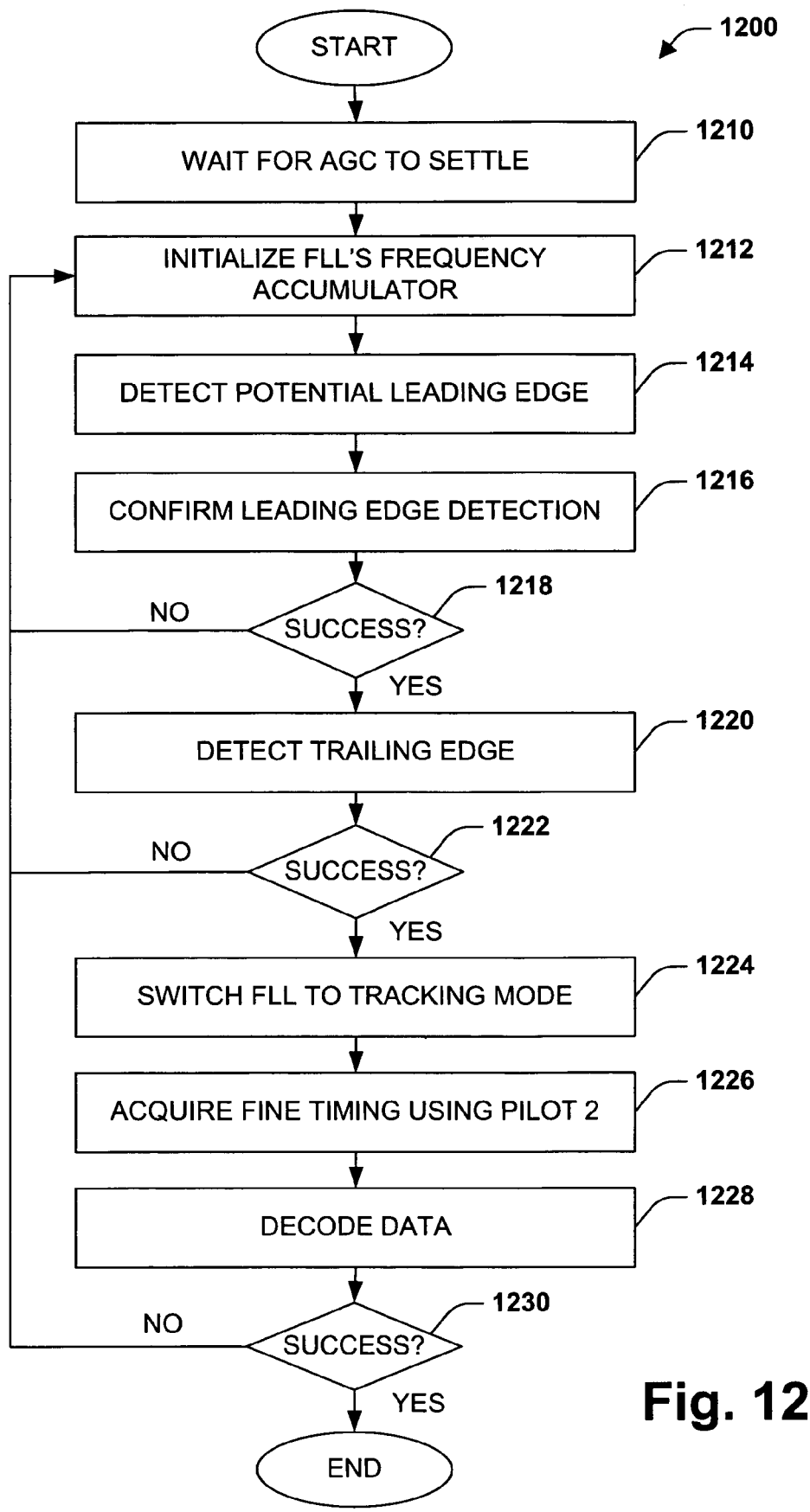
FIG. 12 is a flow chart diagram of a frame synchronization methodology.

FIG. 12 illustrates a frame synchronization methodology 1200. At 1210, the process first waits for automatic gain control (AGC) to settle. Automatic gain control adjusts the input signal to provide a consistent signal strength or level such that the signal can be processed properly. At 1220, a frequency locked loop (FLL) accumulator is initialized. At 1214, a potential leading edge is detected. At 1216, the leading edge can be confirmed by detection of a flat zone and/or a trailing edge. If it is determined that a valid leading edge was not detected at 1218, then the method returns to 1212. It should be appreciated also that it is at this point where the frequency locked loop can be updated periodically utilizing the frequency accumulator, for example to acquire the initial frequency offset. At 1220, the trailing edge can be detected if not previously observed. It is here just prior to the initial dip of the trailing edge that the time can be saved to be used later for fine timing. If the trailing edge is not detected at 1222 and was not previously detected then the method returns to 1212. If the trailing edge was detected then the initial coarse detection has been completed. The procedure continues at 1224 where the frequency locked loop is switch to tracking mode. At 1226, fine timing is acquired utilizing a second TDM pilot symbol and information provided by the prior coarse estimate. In particular, the time instance saved ($T_c$) can correspond to a particular sample offset within the second pilot symbol. In accordance with one embodiment, the saved time sample can correspond to the $256^{th}$ sample in the second pilot symbol. Specific algorithms can them be utilized to improve upon that timing estimate as described in later sections. Upon termination of fine timing acquisition, one or more data symbols can be retrieved and an attempt made to decode such symbols can he undertaken at 1228. If, at 1230, the decoding was successful then the process terminates. However, if the process was not successful then the methodology returns to 1212.

The following is a discussion one of a plurality of suitable operating environments to provide context for particular inventive aspects described supra. Further, in the interest of clarity and understanding a detailed description is provided of one embodiment of time division multiplexed pilots—TDM pilot-1 and TDM pilot-2.

The synchronization techniques described below and throughout may be used for various multi-carrier systems and for the downlink as well as the uplink. The downlink (or forward link) refers to the communication link from the base stations to the wireless devices, and the uplink (or reverse link) refers to the communication link from the wireless devices to the base stations. For clarity, these techniques are described below for the downlink in an OFDM system.

Figure 13:
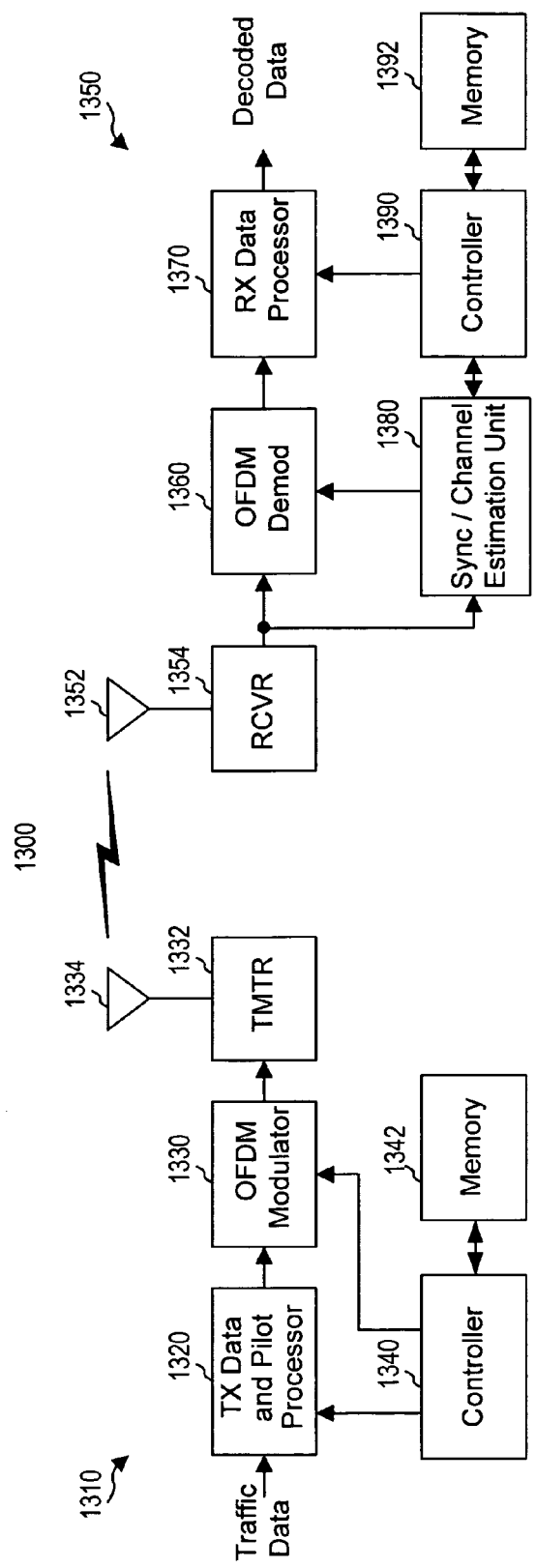
FIG. 13 is a schematic block diagram of a suitable operating environment for various aspects and embodiments.

FIG. 13 shows a block diagram of a base station 1310 and a wireless device 1350 in an OFDM system 1300. Base station 1310 is generally a fixed station and may also be referred to as a base transceiver system (BTS), an access point, or some other terminology. Wireless device 1350 may be fixed or mobile and may also be referred to as a user terminal, a mobile station, or some other terminology. Wireless device 1350 may also be a portable unit such as a cellular phone, a handheld device, a wireless module, a personal digital assistant (PDA), and the like.

At base station 1310, a TX data and pilot processor 1320 receives different types of data (e.g., traffic/packet data and overhead/control data) and processes (e.g., encodes, interleaves, and symbol maps) the received data to generate data symbols. As used herein, a "data symbol" is a modulation symbol for data, a "pilot symbol" is a modulation symbol for pilot, and a modulation symbol is a complex value for a point in a signal constellation for a modulation scheme (e.g., M-PSK, M-QAM, and so on). Processor 1320 also processes pilot data to generate pilot symbols and provides the data and pilot symbols to an OFDM modulator 1330.

OFDM modulator 1330 multiplexes the data and pilot symbols onto the proper subbands and symbol periods and further performs OFDM modulation on the multiplexed symbols to generate OFDM symbols, as described below. A transmitter unit (TMTR) 1332 converts the OFDM symbols into one or more analog signals and further conditions (e.g., amplifies, filters, and frequency upconverts) the analog signal(s) to generate a modulated signal. Base station 1310 then transmits the modulated signal from an antenna 1334 to wireless devices in the system.

At wireless device 1350, the transmitted signal from base station 1310 is received by an antenna 1352 and provided to a receiver unit (RCVR) 1354. Receiver unit 1354 conditions (e.g., filters, amplifies, and frequency downconverts) the received signal and digitizes the conditioned signal to obtain a stream of input samples. An OFDM demodulator 1360 performs OFDM demodulation on the input samples to obtain received data and pilot symbols. OFDM demodulator 1360 also performs detection (e.g., matched filtering) on the received data symbols with a channel estimate (e.g., a frequency response estimate) to obtain detected data symbols, which are estimates of the data symbols sent by base station 1310. OFDM demodulator 1360 provides the detected data symbols to a receive (RX) data processor 1370.

A synchronization/channel estimation unit 1380 receives the input samples from receiver unit 1354 and performs synchronization to determine frame and symbol timing, as described above and below. Unit 1380 also derives the channel estimate using received pilot symbols from OFDM demodulator 1360. Unit 1380 provides the symbol timing and channel estimate to OFDM demodulator 1360 and may provide the frame timing to RX data processor 1370 and/or a controller 1390. OFDM demodulator 1360 uses the symbol timing to perform OFDM demodulation and uses the channel estimate to perform detection on the received data symbols.

RX data processor 1370 processes (e.g., symbol demaps, deinterleaves, and decodes) the detected data symbols from OFDM demodulator 1360 and provides decoded data. RX data processor 1370 and/or controller 1390 may use the frame timing to recover different types of data sent by base station 1310. In general, the processing by OFDM demodulator 1360 and RX data processor 1370 is complementary to the processing by OFDM modulator 1330 and TX data and pilot processor 1320, respectively, at base station 1310.

Controllers 1340 and 1390 direct operation at base station 110 and wireless device 1350, respectively. Memory units 1342 and 1392 provide storage for program codes and data used by controllers 1340 and 1390, respectively.

Base station 1310 may send a point-to-point transmission to a single wireless device, a multi-cast transmission to a group of wireless devices, a broadcast transmission to all wireless devices under its coverage area, or any combination thereof. For example, base station 1310 may broadcast pilot and overhead/control data to all wireless devices under its coverage area. Base station 1310 may further transmit user-specific data to specific wireless devices, multi-cast data to a group of wireless devices, and/or broadcast data to all wireless devices.

Figure 14:
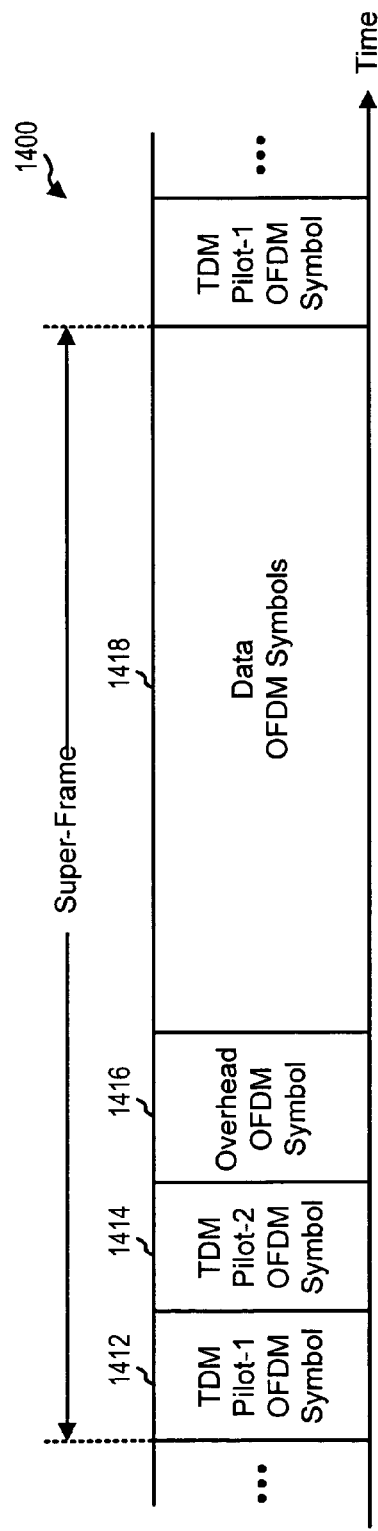
FIG. 14 is a diagram of an embodiment of a super-frame structure for use in an OFDM system.

FIG. 14 shows a super-frame structure 1400 that may be used for OFDM system 1300. Data and pilot may be transmitted in super-frames, with each super-frame having a predetermined time duration (e.g., one second). A super-frame may also be referred to as a frame, a time slot, or some other terminology. For the embodiment shown in FIG. 14, each super-frame includes a field 1412 for a first TDM pilot (or "TDM pilot-1"), a field 1414 for a second TDM pilot (or "TDM pilot-2"), a field 1416 for overhead/control data, and a field 1418 for traffic/packet data.

The four fields 1412 through 1418 are time division multiplexed in each super-frame such that only one field is transmitted at any given moment. The four fields are also arranged in the order shown in FIG. 14 to facilitate synchronization and data recovery. Pilot OFDM symbols in fields 1412 and 1414, which are transmitted first in each super-frame, may be used for detection of overhead OFDM symbols in field 1416, which is transmitted next in the super-frame. Overhead information obtained from field 1416 may then be used for recovery of traffic/packet data sent in field 1418, which is transmitted last in the super-frame.

In an exemplary embodiment, field 1412 carries one OFDM symbol for TDM pilot-1, and field 1414 also carries one OFDM symbol for TDM pilot-2. In general, each field may be of any duration, and the fields may be arranged in any order. TDM pilot-1 and TDM pilot-2 are broadcast periodically in each frame to facilitate synchronization by the wireless devices. Overhead field 1416 and/or data field 1418 may also contain pilot symbols that are frequency division multiplexed with data symbols, as described below.

The OFDM system has an overall system bandwidth of BW MHz, which is partitioned into N orthogonal subbands using OFDM. The spacing between adjacent subbands is BW/N MHz. Of the N total subbands, M subbands may be used for pilot and data transmission, where M<N, and the remaining N−M subbands may be unused and serve as guard subbands. In an embodiment, the OFDM system uses an OFDM structure with N=4096 total subbands, M=4000 usable subbands, and N−M=96 guard subbands. In general, any OFDM structure with any number of total, usable, and guard subbands may be used for the OFDM system.

As described supra, TDM pilots 1 and 2 may be designed to facilitate synchronization by the wireless devices in the system. A wireless device may use TDM pilot-1 to detect the start of each frame, obtain a coarse estimate of symbol timing, and estimate frequency error. The wireless device may subsequently use TDM pilot-2 to obtain more accurate symbol timing.

FIG. 15*a* shows an embodiment of TDM pilot-1 in the frequency domain. For this embodiment, TDM pilot-1 comprises $L_1$ pilot symbols that are transmitted on $L_1$ subbands, one pilot symbol per subband used for TDM pilot-1. The $L_1$ subbands are uniformly distributed across the N total subbands and are equally spaced apart by $S_1$ subbands, where $S_1 = N/L_1$. For example, N=4096, $L_1$=128, and $S_1$=32. However, other values may also be used for N, $L_1$, and $S_1$. This structure for TDM pilot-1 can (1) provide good performance for frame detection in various types of channel including a severe multi-path channel, (2) provide a sufficiently accurate frequency error estimate and coarse symbol timing in a severe multi-path channel, and (3) simplify the processing at the wireless devices, as described below.

FIG. 15b shows an embodiment of TDM pilot-2 in the frequency domain. For this embodiment, TDM pilot-2 comprises $L_2$ pilot symbols that are transmitted on $L_2$ subbands, where $L_2 > L_1$. The $L_2$ subbands are uniformly distributed across the N total subbands and are equally spaced apart by $S_2$ subbands, where $S_2 = N/L_2$. For example, N=4096, $L_2$=2048, and $S_2$=2. Again, other values may also be used for N, $L_2$, and $S_2$. This structure for TDM pilot-2 can provide accurate symbol timing in various types of channel including a severe multi-path channel. The wireless devices may also be able to (1) process TDM pilot-2 in an efficient manner to obtain symbol timing prior to the arrival of the next OFDM symbol, which is can occur immediately after TDM pilot-2, and (2) apply the symbol timing to this next OFDM symbol, as described below.

A smaller value is used for $L_1$ so that a larger frequency error can be corrected with TDM pilot-1. A larger value is used for $L_2$ so that the pilot-2 sequence is longer, which allows a wireless device to obtain a longer channel impulse response estimate from the pilot-2 sequence. The $L_1$ subbands for TDM pilot-1 are selected such that $S_1$ identical pilot-1 sequences are generated for TDM pilot-1. Similarly, the $L_2$ subbands for TDM pilot-2 are selected such that $S_2$ identical pilot-2 sequences are generated for TDM pilot-2.

Figure 16:
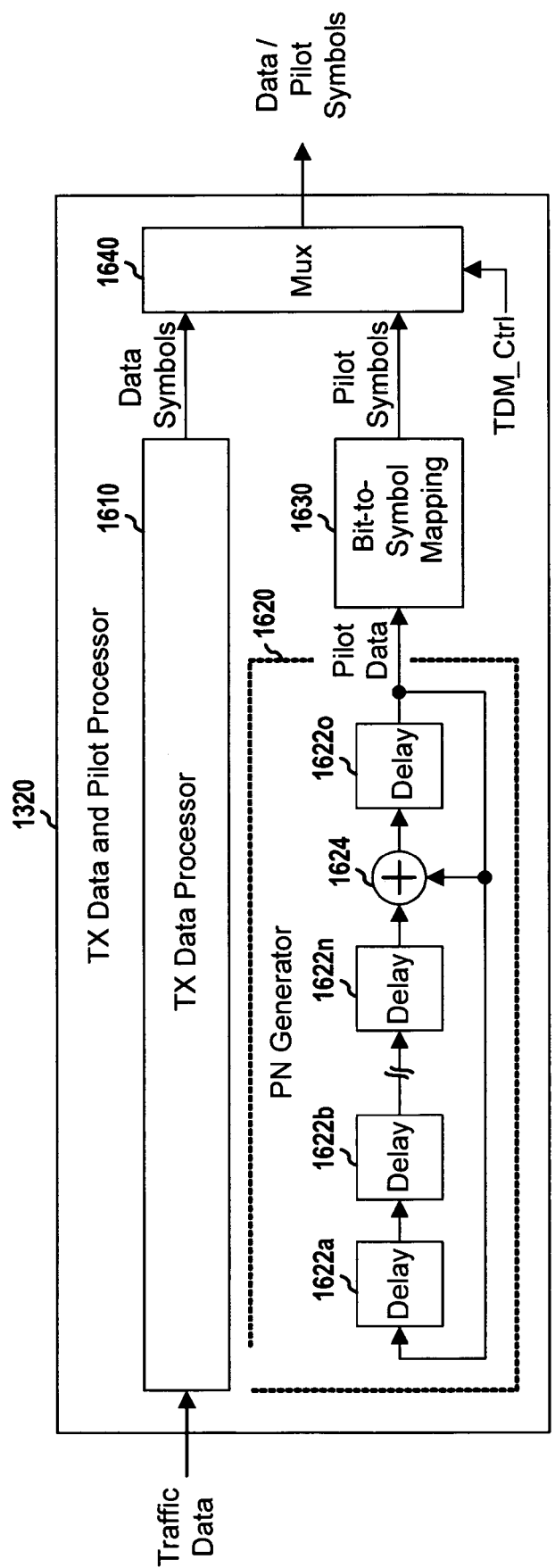
FIG. 16 is a block diagram of an embodiment of TX data and pilot processor at a base station.

FIG. 16 shows a block diagram of an embodiment of TX data and pilot processor 1320 at base station 1310. Within processor 1320, a TX data processor 1610 receives, encodes, interleaves, and symbol maps traffic/packet data to generate data symbols.

In an embodiment, a pseudo-random number (PN) generator 1620 is used to generate data for both TDM pilots 1 and 2. PN generator 1620 may be implemented, for example, with a 15-tap linear feedback shift register (LFSR) that implements a generator polynomial $g(x)=x^{15}+x^{14}+1$. In this case, PN generator 1620 includes (1) 15 delay elements 1622a through 1622o coupled in series and (2) a summer 1624 coupled between delay elements 1622n and 1622o. Delay element 1622o provides pilot data, which is also fed back to the input of delay element 1622a and to one input of summer 1624. PN generator 1620 may be initialized with different initial states for TDM pilots 1 and 2, e.g., to '011010101001110' for TDM pilot-1 and to '010110100011100' for TDM pilot-2. In general, any data may be used for TDM pilots 1 and 2. The pilot data may be selected to reduce the difference between the peak amplitude and the average amplitude of a pilot OFDM symbol (i.e., to minimize the peak-to-average variation in the time-domain waveform for the TDM pilot). The pilot data for TDM pilot-2 may also be generated with the same PN generator used for scrambling data. The wireless devices have knowledge of the data used for TDM pilot-2 but do not need to know the data used for TDM pilot-1.

A bit-to-symbol mapping unit 1630 receives the pilot data from PN generator 1620 and maps the bits of the pilot data to pilot symbols based on a modulation scheme. The same or different modulation schemes may be used for TDM pilots 1 and 2. In an embodiment, QPSK is used for both TDM pilots 1 and 2. In this case, mapping unit 1630 groups the pilot data into 2-bit binary values and further maps each 2-bit value to a specific pilot modulation symbol. Each pilot symbol is a complex value in a signal constellation for QPSK. If QPSK is used for the TDM pilots, then mapping unit 1630 maps $2L_1$ pilot data bits for TDM pilot 1 to $L_1$ pilot symbols and further maps $2L_2$ pilot data bits for TDM pilot 2 to $L_2$ pilot symbols.

A multiplexer (Mux) 440 receives the data symbols from TX data processor 1610, the pilot symbols from mapping unit 1630, and a TDM_Ctrl signal from controller 1340. Multiplexer 1640 provides to OFDM modulator 1330 the pilot symbols for the TDM pilot 1 and 2 fields and the data symbols for the overhead and data fields of each frame, as shown in FIG. 14.

Figure 17:
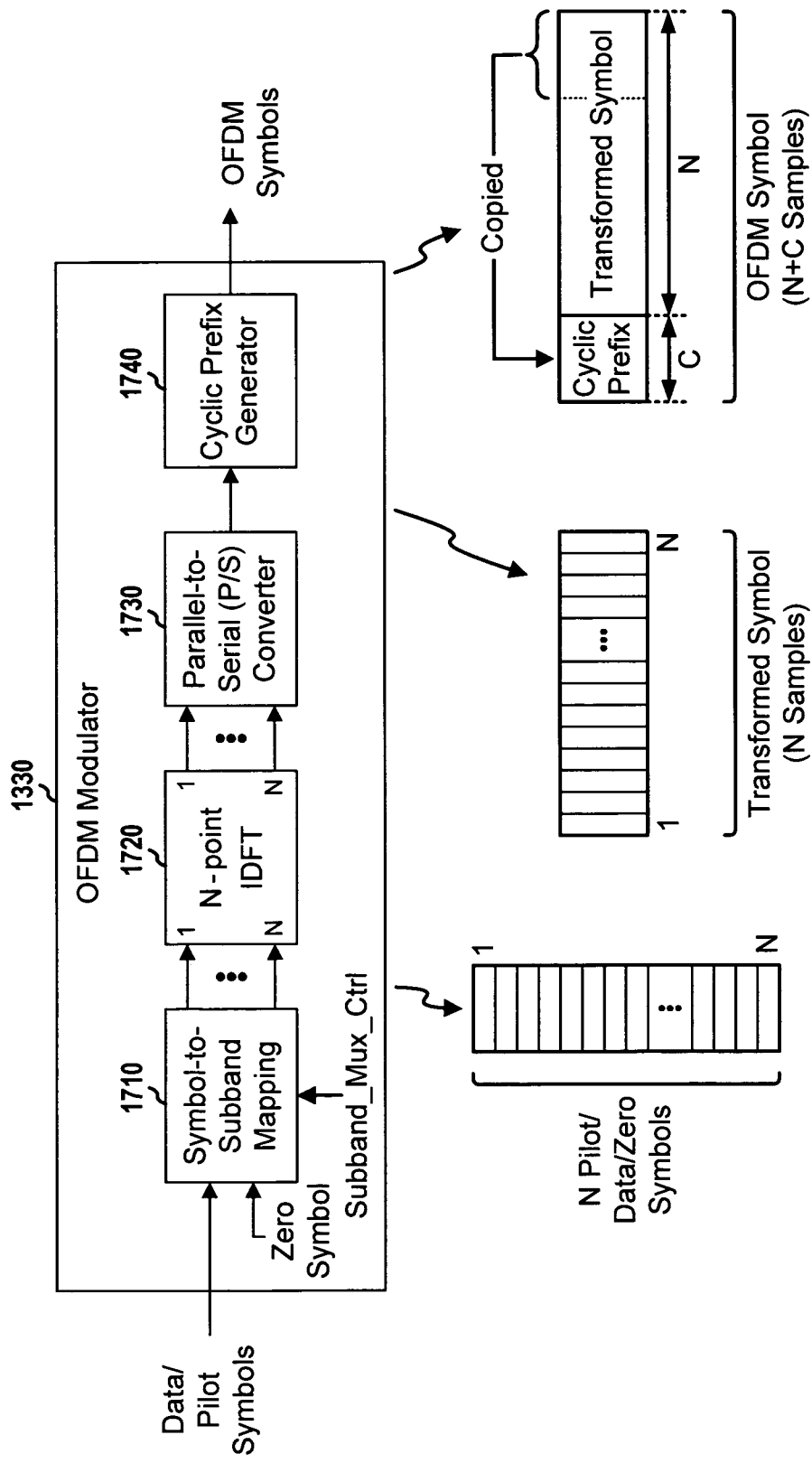
FIG. 17 is a block diagram of an embodiment of OFDM modulator at a base station.

FIG. 17 shows a block diagram of an embodiment of OFDM modulator 1330 at base station 1310. A symbol-to-subband mapping unit 1710 receives the data and pilot symbols from TX data and pilot processor 1320 and maps these symbols onto the proper subbands based on a Subband_Mux_Ctrl signal from controller 1340. In each OFDM symbol period, mapping unit 1710 provides one data or pilot symbol on each subband used for data or pilot transmission and a "zero symbol" (which is a signal value of zero) for each unused subband. The pilot symbols designated for subbands that are not used are replaced with zero symbols. For each OFDM symbol period, mapping unit 1710 provides N "transmit symbols" for the N total subbands, where each transmit symbol may be a data symbol, a pilot symbol, or a zero symbol. An inverse discrete Fourier transform (IDFT) unit 1720 receives the N transmit symbols for each OFDM symbol period, transforms the N transmit symbols to the time domain with an N-point IDFT, and provides a "transformed" symbol that contains N time-domain samples. Each sample is a complex value to be sent in one sample period. An N-point inverse fast Fourier transform (IFFT) may also be performed in place of an N-point IDFT if N is a power of two, which is typically the case. A parallel-to-serial (P/S) converter 1730 serializes the N samples for each transformed symbol. A cyclic prefix generator 1740 then repeats a portion (or C samples) of each transformed symbol to form an OFDM symbol that contains N+C samples. The cyclic prefix is used to combat inter-symbol interference (ISI) and intercarrier interference (ICI) caused by a long delay spread in the communication channel. Delay spread is the time difference between the earliest arriving signal instance and the latest arriving signal instance at a receiver. An OFDM symbol period (or simply, a "symbol period") is the duration of one OFDM symbol and is equal to N+C sample periods.

Figure 18A:
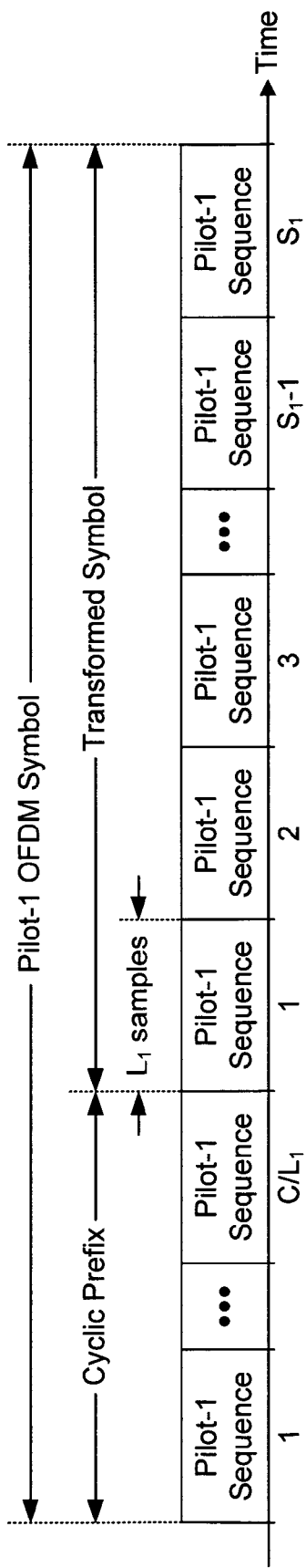
FIG. 18a is a diagram of a time-domain representation of TDM pilot-1.

FIG. 18a shows a time-domain representation of TDM pilot-1. An OFDM symbol for TDM pilot-1 (or "pilot-1 OFDM symbol") is composed of a transformed symbol of length N and a cyclic prefix of length C. Because the $L_1$ pilot symbols for TDM pilot 1 are sent on $L_1$ subbands that are evenly spaced apart by $S_1$ subbands, and because zero symbols are sent on the remaining subbands, the transformed symbol for TDM pilot 1 contains $S_1$ identical pilot-1 sequences, with each pilot-1 sequence containing $L_1$ time-domain samples. Each pilot-1 sequence may also be generated by performing an $L_1$-point IDFT on the $L_1$ pilot symbols for TDM pilot 1. The cyclic prefix for TDM pilot-1 is composed of the C rightmost samples of the transformed symbol and is inserted in front of the transformed symbol. The pilot-1 OFDM symbol thus contains a total of $S_1+C/L_1$ pilot-1 sequences. For example, if N=4096, $L_1$=128, $S_1$=32, and C=512, then the pilot-1 OFDM symbol would contain 36 pilot-1 sequences, with each pilot-1 sequence containing 128 time-domain samples.

Figure 18B:
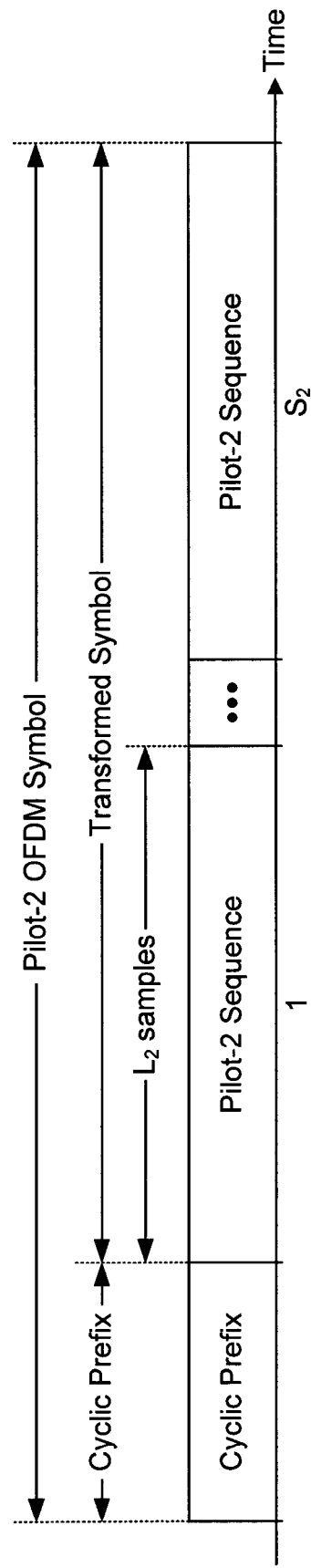
FIG. 18b is a diagram of a time-domain representation of TDM pilot-2.

FIG. 18b shows a time-domain representation of TDM pilot-2. An OFDM symbol for TDM pilot-2 (or "pilot-2 OFDM symbol") is also composed of a transformed symbol of length N and a cyclic prefix of length C. The transformed symbol for TDM pilot 2 contains $S_2$ identical pilot-2 sequences, with each pilot-2 sequence containing $L_2$ time-domain samples. The cyclic prefix for TDM pilot 2 is composed of the C rightmost samples of the transformed symbol and is inserted in front of the transformed symbol. For example, if N=4096, $L_2$=2048, $S_2$=2, and C=512, then the pilot-2 OFDM symbol would contain two complete pilot-2 sequences, with each pilot-2 sequence containing 2048 time-domain samples. The cyclic prefix for TDM pilot 2 would contain only a portion of the pilot-2 sequence.

Figure 19:
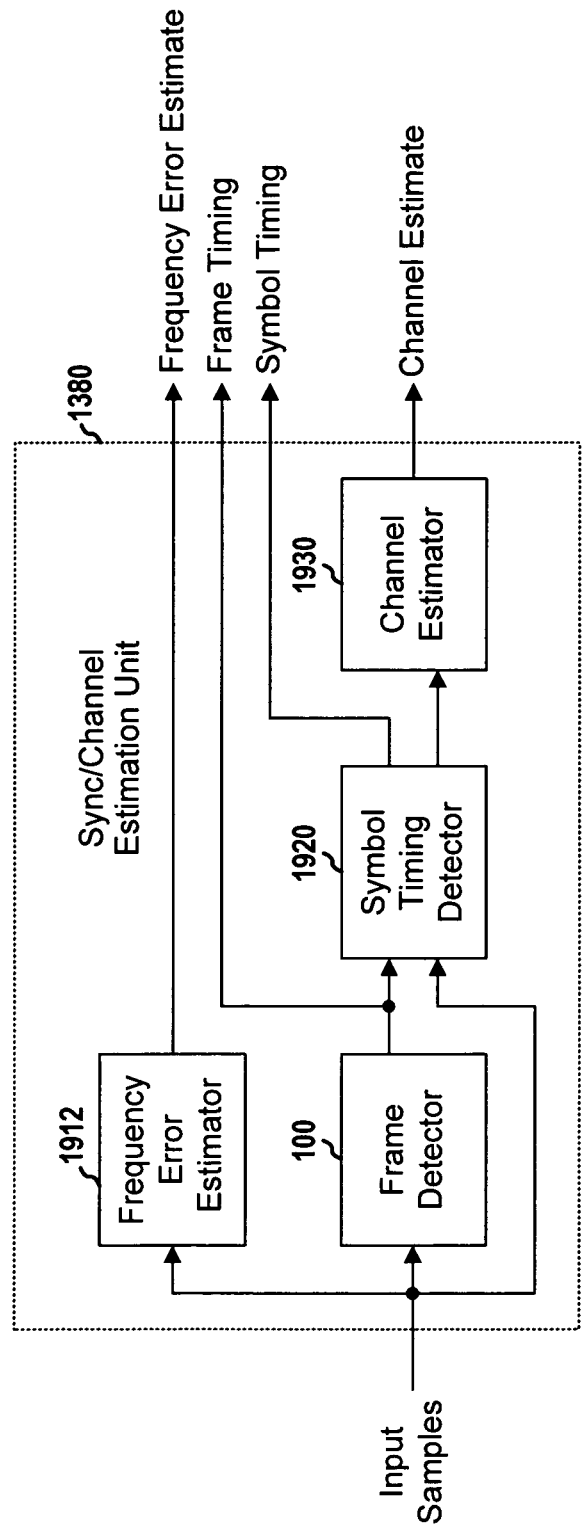
FIG. 19 is a block diagram of an embodiment of synchronization and channel estimation unit at a wireless device.

FIG. 19 shows a block diagram of an embodiment of synchronization and channel estimation unit 1380 at wireless device 1350 (FIG. 13). Within unit 1380, a frame detector 100 (as described in detail in supra) receives the input samples from receiver unit 1354, processes the input samples to detect for the start of each frame, and provides the frame timing. A symbol timing detector 1920 receives the input samples and the frame timing, processes the input samples to detect for the start of the received OFDM symbols, and provides the symbol timing. A frequency error estimator 1912 estimates the frequency error in the received OFDM symbols. A channel estimator 1930 receives an output from symbol timing detector 1920 and derives the channel estimate.

As described in further detail in FIG. 1, frame detector 100, performs frame synchronization by detecting, for example, for TDM pilot-1 in the input samples from receiver unit 1354. For simplicity, the instant detailed description assumes that the communication channel is an additive white Gaussian noise (AWGN) channel. The input sample for each sample period may be expressed as:

$$r_n = x_n + w_n, \quad \text{Eq (2)}$$

where
- n is an index for sample period;
- $x_n$ is a time-domain sample sent by the base station in sample period n;
- $r_n$ is an input sample obtained by the wireless device in sample period n; and
- $w_n$ is the noise for sample period n.

Frequency error estimator 1912 estimates the frequency error in the received pilot-1 OFDM symbol. This frequency error may be due to various sources such as, for example, a difference in the frequencies of the oscillators at the base station and wireless device, Doppler shift, and so on. Frequency error estimator 1912 may generate a frequency error estimate for each pilot-1 sequence (except for the last pilot-1 sequence), as follows:

$$\Delta f_l = \frac{1}{G_D} \text{Arg} \left[ \sum_{i=1}^{L_1} r_{l,i} \cdot r^*_{l,i+L_1} \right], \quad \text{Eq (1)}$$

where
- $r_{l,i}$ is the i-th input sample for the l-th pilot-1 sequence;
- Arg (x) is the arc-tangent of the ratio of the imaginary component of x over the real component of x, or Arg (x)=arctan [Im(x)/Re(x)];
- $G_D$ is a detector gain, which is $$G_D = \frac{2\pi \cdot L_1}{f_{samp}}; \text{ and}$$

- $\Delta f_l$ is the frequency error estimate for the l-th pilot-1 sequence.

The range of detectable frequency errors may be given as:

$$2\pi \cdot L_1 \cdot \frac{|\Delta f_l|}{f_{samp}} < \pi/2, \quad \text{or} \quad |\Delta f_l| < \frac{f_{samp}}{4 \cdot L_1}, \quad \text{Eq (2)}$$

where $f_{samp}$ is the input sample rate. Equation (2) indicates that the range of detected frequency errors is dependent on, and inversely related to, the length of the pilot-1 sequence. Frequency error estimator 1912 may also be implemented within the frame detector component 100 and more specifically by way of the delayed correlator component 110 since the accumulated correlation results are also available from summer 524.

The frequency error estimates may be used in various manners. For example, the frequency error estimate for each pilot-1 sequence may be used to update a frequency tracking loop that attempts to correct for any detected frequency error at the wireless device. The frequency-tracking loop may be a phase-locked loop (PLL) that can adjust the frequency of a carrier signal used for frequency downconversion at the wireless device. The frequency error estimates may also be averaged to obtain a single frequency error estimate Δf for the pilot-1 OFDM symbol. This Δf may then be used for frequency error correction either prior to or after the N-point DFT within OFDM demodulator 160. For post-DFT frequency error correction, which may be used to correct a frequency offset Δf that is an integer multiple of the subband spacing, the received symbols from the N-point DFT may be translated by Δf subbands, and a frequency-corrected symbol $\tilde{R}_k$ for each applicable subband k may be obtained as $\tilde{R}_k = \tilde{R}_{k+\Delta f}$. For pre-DFT frequency error correction, the input samples may be phase rotated by the frequency error estimate Δf, and the N-point DFT may then be performed on the phase-rotated samples.

Frame detection and frequency error estimation may also be performed in other manners based on the pilot-1 OFDM symbol. For example, frame detection may be achieved by performing a direct correlation between the input samples for pilot-1 OFDM symbol with the actual pilot-1 sequence generated at the base station. The direct correlation provides a high correlation result for each strong signal instance (or multipath). Since more than one multipath or peak may be obtained for a given base station, a wireless device would perform post-processing on the detected peaks to obtain timing information. Frame detection may also be achieved with a combination of delayed correlation and direct correlation.

Figure 20:
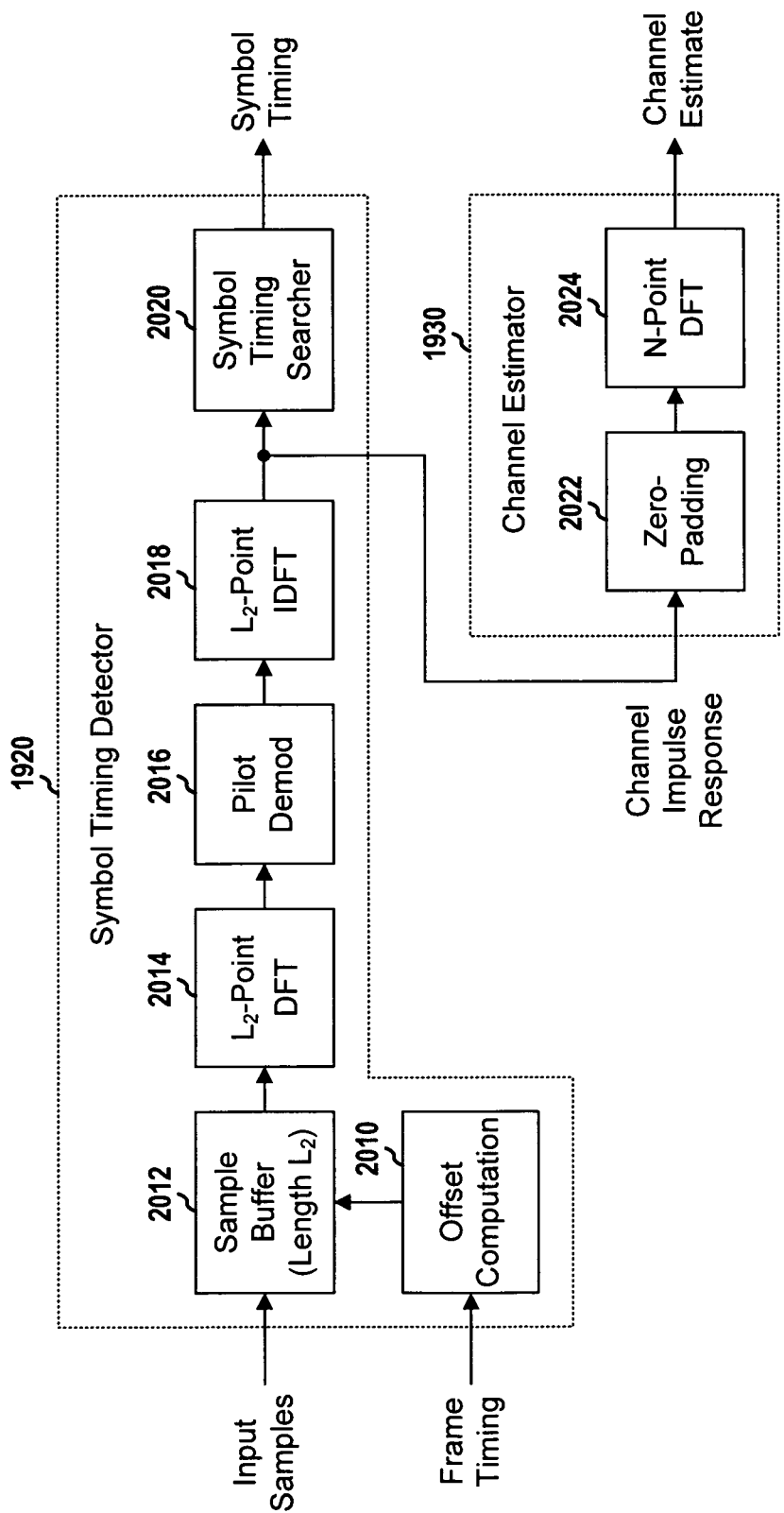
FIG. 20 is a block diagram of an embodiment of symbol timing detector that performs timing synchronization based on the pilot-2 OFDM symbol.

FIG. 20 shows a block diagram of an embodiment of symbol timing detector 1920, which performs timing synchronization based on the pilot-2 OFDM symbol. Within symbol timing detector 1920, a sample buffer 2012 receives the input samples from receiver unit 1354 and stores a "sample" window of $L_2$ input samples for the pilot-2 OFDM symbol. The start of the sample window is determined by a unit 2010 based on the frame timing from frame detector 100.

Figure 21A:
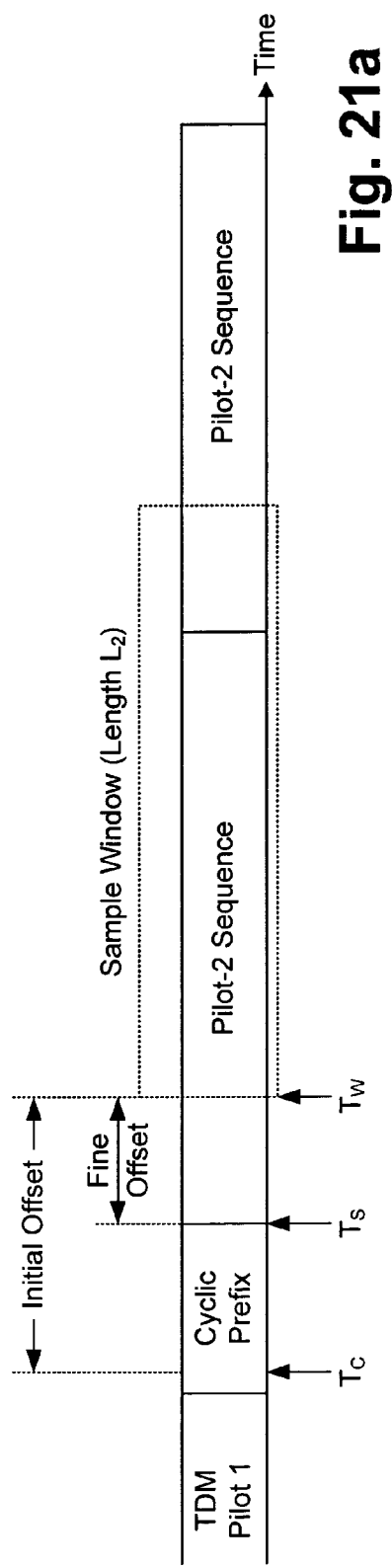
FIG. 21a is a timing diagram of the processing for a TDM pilot-2 OFDM symbol.

FIG. 21*a* shows a timing diagram of the processing for the pilot-2 OFDM symbol. Frame detector 100 provides the coarse symbol timing (denoted as Tc) based on the pilot-1 OFDM symbol. The pilot-2 OFDM symbol contains $S_2$ identical pilot-2 sequences of length $L_2$ (e.g., two pilot-2 sequences of length 2048 if N=4096 and $L_2$=2048). A window of $L_2$ input samples is collected by sample buffer 912 for the pilot-2 OFDM symbol starting at sample period $T_W$. The start of the sample window is delayed by an initial offset $OS_{init}$ from the coarse symbol timing, or $T_W = T_C + OS_{init}$. The initial offset does not need to be accurate and is selected to ensure that one complete pilot-2 sequence is collected in sample buffer 2012. The initial offset may also be selected such that the processing for the pilot-2 OFDM symbol can be completed before the arrival of the next OFDM symbol, so that the symbol timing obtained from the pilot-2 OFDM symbol may be applied to this next OFDM symbol.

Referring back to FIG. 20, a DFT unit 2014 performs an $L_2$-point DFT on the $L_2$ input samples collected by sample buffer 2012 and provides $L_2$ frequency-domain values for $L_2$ received pilot symbols. If the start of the sample window is not aligned with the start of the pilot-2 OFDM symbol (i.e., $T_W \neq T_S$), then the channel impulse response is circularly shifted, which means that a front portion of the channel impulse response wraps around to the back. A pilot demodulation unit 2016 removes the modulation on the $L_2$ received pilot symbols by multiplying the received pilot symbol $R_k$ for each pilot subband k with the complex-conjugate of the known pilot symbol $P_k^*$ for that subband, or $R_k \cdot P_k^*$. Unit 2016 also sets the received pilot symbols for the unused subbands to zero symbols. An IDFT unit 2018 then performs an $L_2$-point IDFT on the $L_2$ pilot demodulated symbols and provides $L_2$ time-domain values, which are $L_2$ taps of an impulse response of the communication channel between base station 110 and wireless device 150.

Figure 21B:
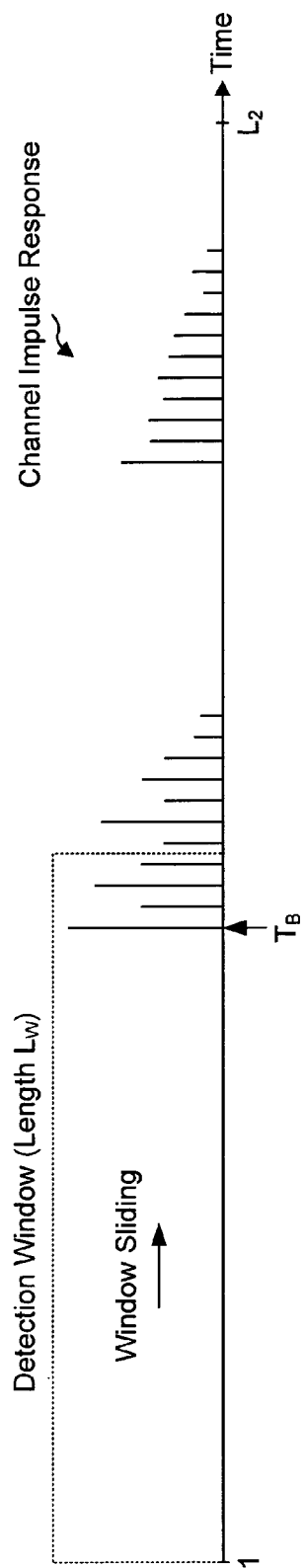
FIG. 21b is a timing diagram of an $L_2$-tap channel impulse response from IDFT unit

FIG. 21b shows the $L_2$-tap channel impulse response from IDFT unit 2018. Each of the $L_2$ taps is associated with a complex channel gain at that tap delay. The channel impulse response may be cyclically shifted, which means that the tail portion of the channel impulse response may wrap around and appear in the early portion of the output from IDFT unit 2018.

Referring back to FIG. 20, a symbol timing searcher 2020 may determine the symbol timing by searching for the peak in the energy of the channel impulse response. The peak detection may be achieved by sliding a "detection" window across the channel impulse response, as indicated in FIG. 21b. The detection window size may be determined as described below. At each window starting position, the energy of all taps falling within the detection window is computed.

Figure 21C:
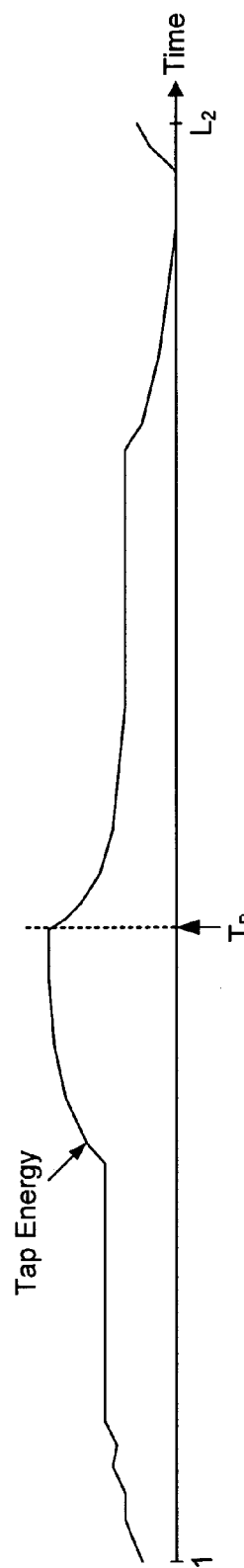
FIG. 21c is a plot of the energy of channel taps at different window starting positions

FIG. 21c shows a plot of the energy of the channel taps at different window starting positions. The detection window is shifted to the right circularly so that when the right edge of the detection window reaches the last tap at index $L_2$, the window wraps around to the first tap at index 1. Energy is thus collected for the same number of channel taps for each window starting position.

The detection window size $L_W$ may be selected based on the expected delay spread of the system. The delay spread at a wireless device is the time difference between the earliest and latest arriving signal components at the wireless device. The delay spread of the system is the largest delay spread among all wireless devices in the system. If the detection window size is equal to or larger than the delay spread of the system, then the detection window, when properly aligned, would capture all of the energy of the channel impulse response. The detection window size $L_W$ may also be selected to be no more than half of $L_2$ (or $L_W < L_2/2$) to avoid ambiguity in the detection of the beginning of the channel impulse response. The beginning of the channel impulse response may be detected by (1) determining the peak energy among all of the $L_2$ window starting positions and (2) identifying the rightmost window starting position with the peak energy, if multiple window starting positions have the same peak energy. The energies for different window starting positions may also be averaged or filtered to obtain a more accurate estimate of the beginning of the channel impulse response in a noisy channel. In any case, the beginning of the channel impulse response is denoted as $T_B$, and the offset between the start of the sample window and the beginning of the channel impulse response is $T_{OS} = T_B - T_W$. Fine symbol timing may be uniquely computed once the beginning of the channel impulse response $T_B$ is determined.

Referring to FIG. 21a, the fine symbol timing is indicative of the start of the received OFDM symbol. The fine symbol timing $T_S$ may be used to accurately and properly place a "DFT" window for each subsequently received OFDM symbol. The DFT window indicates the specific N input samples (from among N+C input samples) to collect for each received OFDM symbol. The N input samples within the DFT window are then transformed with an N-point DFT to obtain N received data/pilot symbols for the received OFDM symbol. Accurate placement of the DFT window for each received OFDM symbol is needed in order to avoid (1) inter-symbol interference (ISI) from a preceding or next OFDM symbol, (2) degradation in channel estimation (e.g., improper DFT window placement may result in an erroneous channel estimate), (3) errors in processes that rely on the cyclic prefix (e.g., frequency tracking loop, automatic gain control (AGC), and so on), and (4) other deleterious effects.

The pilot-2 OFDM symbol may also be used to obtain a more accurate frequency error estimate. For example, the frequency error may be estimated using the pilot-2 sequences and based on equation (3). In this case, the summation is performed over $L_2$ samples (instead of $L_1$ samples) for the pilot-2 sequence.

The channel impulse response from IDFT unit 2018 may also be used to derive a frequency response estimate for the communication channel between base station 1310 and wireless device 1350. A unit 2022 receives the $L_2$-tap channel impulse response, circularly shifts the channel impulse response so that the beginning of the channel impulse response is at index 1, inserts an appropriate number of zeros after the circularly-shifted channel impulse response, and provides an N-tap channel impulse response. A DFT unit 2024 then performs an N-point DFT on the N-tap channel impulse response and provides the frequency response estimate, which is composed of N complex channel gains for the N total subbands. OFDM demodulator 1360 may use the frequency response estimate for detection of received data symbols in subsequent OFDM symbols. The channel estimate may also be derived in some other manner.

Figure 22:
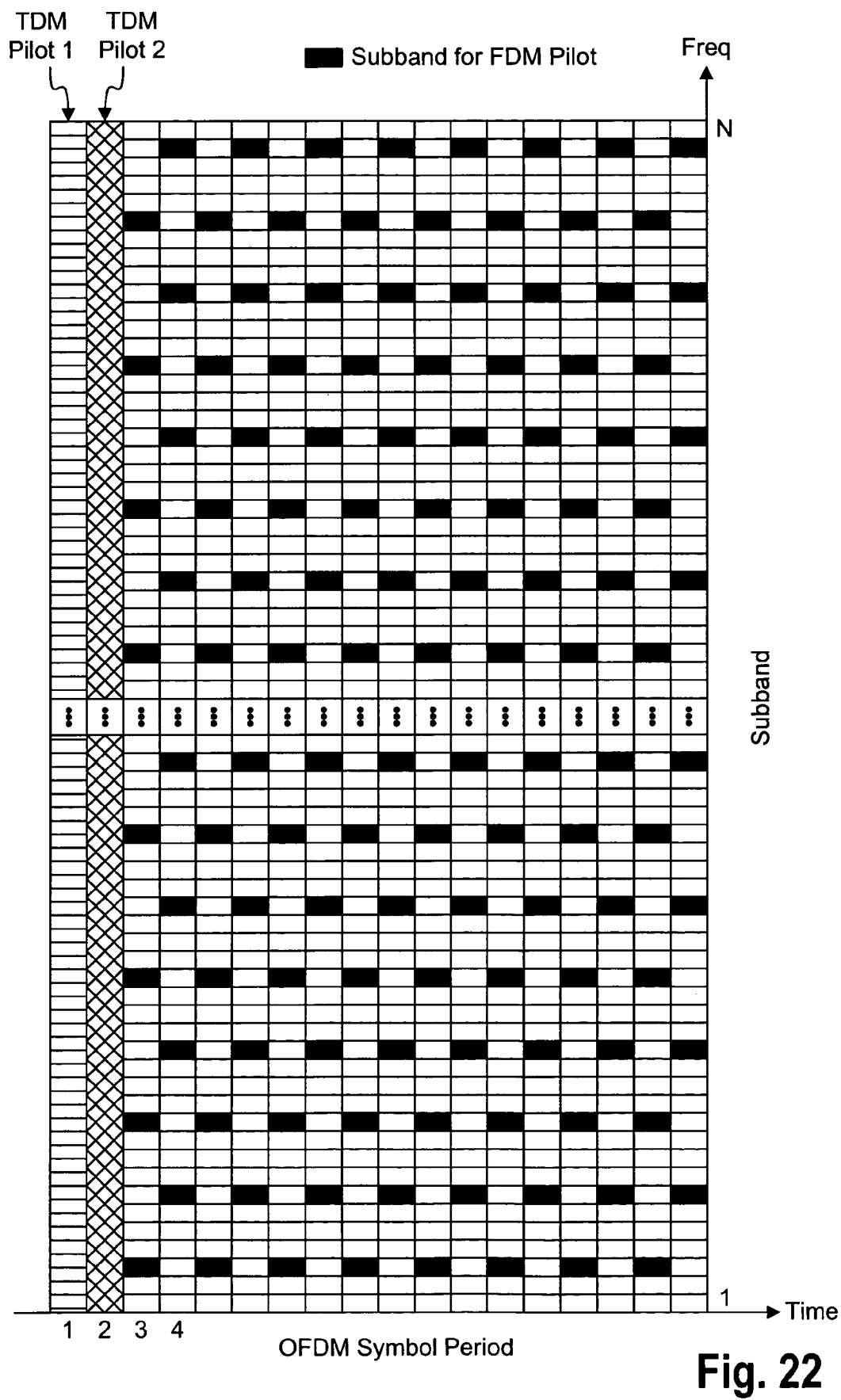
FIG. 22 is a diagram of a pilot transmission scheme with a combination of TDM and FDM pilots

FIG. 22 shows a pilot transmission scheme with a combination of TDM and FDM pilots. Base station 1310 may transmit TDM pilots 1 and 2 in each super-frame to facilitate initial acquisition by the wireless devices. The overhead for the TDM pilots is two OFDM symbols, which may be small compared to the size of the super-frame. The base station 1310 may also transmit an FDM pilot in all, most, or some of the remaining OFDM symbols in each super-frame. For the embodiment shown in FIG. 22, the FDM pilot is sent on alternating sets of subbands such that pilot symbols are sent on one set of subbands in even-numbered symbol periods and on another set of subbands in odd-numbered symbol periods. Each set contains a sufficient number of ($L_{fdm}$) subbands to support channel estimation and possibly frequency and time tracking by the wireless devices. The subbands in each set may be uniformly distributed across the N total subbands and evenly spaced apart by $S_{fdm} = N/L_{fdm}$ subbands. Furthermore, the subbands in one set may be staggered or offset with respect to the subbands in the other set, so that the subbands in the two sets are interlaced with one another. As an example, N=4096, $L_{fdm}$=512, $S_{fdm}$=8, and the subbands in the two sets may be staggered by four subbands. In general, any number of subband sets may be used for the FDM pilot, and each set may contain any number of subbands and any one of the N total subbands.

A wireless device may use TDM pilots 1 and 2 for initial synchronization, for example for frame synchronization, frequency offset estimation, and fine symbol timing acquisition (for proper placement of the DFT window for subsequent OFDM symbols). The wireless device may perform initial synchronization, for example, when accessing a base station for the first time, when receiving or requesting data for the first time or after a long period of inactivity, when first powered on, and so on.

The wireless device may perform delayed correlation of the pilot-1 sequences to detect for the presence of a pilot-1 OFDM symbol and thus the start of a super-frame, as described above. Thereafter, the wireless device may use the pilot-1 sequences to estimate the frequency error in the pilot-1 OFDM symbol and to correct for this frequency error prior to receiving the pilot-2 OFDM symbol. The pilot-1 OFDM symbol allows for estimation of a larger frequency error and for more reliable placement of the DFT window for the next (pilot-2) OFDM symbol than conventional methods that use the cyclic prefix structure of the data OFDM symbols. The pilot-1 OFDM symbol can thus provide improved performance for a terrestrial radio channel with a large multi-path delay spread.

The wireless device may use the pilot-2 OFDM symbol to obtain fine symbol timing to more accurately place the DFT window for subsequent received OFDM symbols. The wireless device may also use the pilot-2 OFDM symbol for channel estimation and frequency error estimation. The pilot-2 OFDM symbol allows for fast and accurate determination of the fine symbol timing and proper placement of the DFT window.

The wireless device may use the FDM pilot for channel estimation and time tracking and possibly for frequency tracking. The wireless device may obtain an initial channel estimate based on the pilot-2 OFDM symbol, as described above. The wireless device may use the FDM pilot to obtain a more accurate channel estimate, particularly if the FDM pilot is transmitted across the super-frame, as shown in FIG. 11. The wireless device may also use the FDM pilot to update the frequency-tracking loop that can correct for frequency error in the received OFDM symbols. The wireless device may further use the FDM pilot to update a time tracking loop that can account for timing drift in the input samples (e.g., due to changes in the channel impulse response of the communication channel).

The synchronization techniques described herein may be implemented by various means. For example, these techniques may be implemented in hardware, software, or a combination thereof. For a hardware implementation, the processing units at a base station used to support synchronization (e.g., TX data and pilot processor 120) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless device used to perform synchronization (e.g., synchronization and channel estimation unit 180) may also be implemented within one or more ASICs, DSPs, and so on.

For a software implementation, the synchronization techniques may be implemented in combination with program modules (e.g., routines, programs, components, procedures, functions, data structures, schemas . . . ) that perform the various functions described herein. The software codes may be stored in a memory unit (e.g., memory unit 1392 in FIG. 13) and executed by a processor (e.g., controller 190). The memory unit may be implemented within the processor or external to the processor. Moreover, those skilled in the art will appreciate that the subject inventive methods may be practiced with other computer system configurations, including single-processor or multiprocessor computer systems, mini-computing devices, mainframe computers, as well as personal computers, hand-held computing devices, microprocessor-based or programmable consumer electronics, and the like.

As used herein, OFDM may also include an orthogonal frequency division multiple access (OFDMA) architecture where multiple users share the OFDM channels.

What has been described above includes examples of various aspects and embodiments. It is, of course, not possible to describe every conceivable combination of components or methodologies. Various modifications to these embodiments will be readily apparent to those of skill in the art, and the generic principles defined herein may be applied to other embodiments without departing from the spirit or scope of the aforementioned embodiments. Thus, the disclosed embodiments are not intended to be limited to the aspects and embodiments shown and described herein but is to be accorded the widest scope consistent with the principles and novel features and techniques disclosed herein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of initial frame detection and synchronization comprising:
    receiving a stream of input signals at least some being associated with a pilot symbol;
    generating correlation outputs forming a correlation curve from the signals and delayed copies thereof;
    detecting a potential leading edge of the correlation curve from correlation outputs, wherein the potential leading edge detection comprises:
        comparing a correlation output to a threshold;
        incrementing a counter if the output is greater than or equal to the threshold; and
        analyzing the counter to determine if it is equal to a predefined value;
    confirming leading edge detection from correlation outputs; and
    detecting a trailing edge of the curve from correlation outputs.

2. The method of claim 1, wherein the predefined value is 64.

3. The method of claim 1, wherein confirming leading edge detection includes detecting a flat zone and/or a trailing edge.

4. The method of claim 1, further comprising updating a frequency-locked loop periodically prior to detection of the trailing edge.

5. The method of claim 1, wherein the pilot symbol is a TDM symbol.

6. A method of initial frame detection and synchronization comprising:
    receiving a stream of input signals at least some being associated with a pilot symbol;
    generating correlation outputs forming a correlation curve from the signals and delayed copies thereof;

detecting a potential leading edge of the correlation curve from correlation outputs;
confirming leading edge detection from correlation outputs, wherein confirming leading edge detection includes detecting a flat zone or a trailing edge, wherein the flat zone is detected by counting the number of times the correlator values are greater than or equal to a threshold; and
detecting a trailing edge of the curve from correlation outputs.

7. A method of initial frame detection and synchronization comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs, wherein confirming leading edge detection includes detecting a flat zone or a trailing edge; and
detecting a trailing edge of the curve from correlation outputs, wherein the trailing edge is detected by counting the number of times the correlator output is less than a threshold.

8. A method of initial frame detection and synchronization comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs, wherein confirming detection of the leading edge comprises:
incrementing a first counter if the correlation value is greater than or equal to a threshold;
incrementing a second counter if the correlation value is less than the threshold otherwise setting the second counter equal to zero; and
examining the values of the first and second counters to decipher what is being received; and
detecting a trailing edge of the curve from correlation outputs.

9. The method of claim 8, wherein a false leading edge is detected when the first counter is substantially equal to the second counter.

10. The method of claim 8, further comprising saving a time for use by a fine timing algorithm when the second counter is equal to zero.

11. The method of claim 8, further comprising incrementing a third counter for each new sample received and correlated.

12. The method of claim 11, wherein the beginning of the trailing edge is observed when the third counter indicates that an entire flat zone should have been received and the second counter is greater than zero.

13. The method of claim 8, further comprising requiring the first counter value to be greater than or equal to half the number of what it would be without the tempering effect of noise prior to declaring detection of a flat zone or a trailing edge.

14. A method of initial frame detection and synchronization comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs; and
detecting a trailing edge of the curve from correlation outputs, wherein detecting the trailing edge comprises:
incrementing a first counter when the correlation value is less than a threshold, otherwise setting the first counter equal to zero; and
determining when the first counter is equal to a predetermined value.

15. The method of claim 14, wherein the predetermined value is 32.

16. The method of claim 14, further comprising saving a time, when the first counter is equal to zero, for use by a fine timing algorithm.

17. The method of claim 14, further comprising incrementing a second counter for every sample received to facilitate timing out a trailing edge detection process after a predetermined number of samples.

18. A computer implemented method of frame synchronization and initial symbol timing acquisition comprising:
receiving broadcast signals that transmit at least a plurality of wireless symbols;
detecting a potential leading edge of a correlator output associated with a first pilot symbol, wherein the potential leading edge is detected by analyzing output of a delayed correlator to determine if the output exceeds a threshold for a predetermined number of consecutive times;
confirming leading edge detection by detecting a correlator output flat zone; and
detecting a trailing edge of the correlator output.

19. The method of claim 18, wherein the wireless symbols are OFDM symbols.

20. The method of claim 18, wherein the pilot symbol is a TDM pilot symbol.

21. A computer implemented method of frame synchronization and initial symbol timing acquisition, comprising:
receiving broadcast signals that transmit at least a plurality of wireless symbols;
detecting a potential leading edge of a correlator output associated with a first wireless symbol;
confirming leading edge detection by detecting a correlator output flat zone;
detecting a trailing edge of the correlator output; and
updating a frequency loop periodically during observation of the flat zone.

22. The method of claim 21, further comprising saving a time instance prior just prior to detection of a trailing edge, wherein the time instance is related to a specific number of samples into a second wireless symbol.

23. The method of claim 22, wherein the second wireless symbol is a TDM pilot symbol.

24. The method of claim 22, further comprising switching the frequency loop to tracking mode.

25. The method of claim 24, further comprising acquiring fine timing utilizing the second wireless symbol and the saved time instance.

26. A computer implemented method of frame synchronization and initial symbol timing acquisition, comprising:
receiving broadcast signals that transmit at least a plurality of wireless symbols;
detecting a potential leading edge of a correlator output associated with a first wireless symbol;

confirming leading edge detection by detecting a correlator output flat zone, wherein detecting the flat zone comprises:
generating correlation outputs by correlating new signal samples with a delayed version thereof;
comparing the correlation output to a threshold; and
incrementing a counter when the correlation output is greater than or equal to the threshold, wherein the flat zone is detected when the counter value is at least half of the value that would be detected in an ideal environment; and
detecting a trailing edge of the correlator output.

27. A computer implemented method of frame synchronization and initial symbol timing acquisition, comprising:
receiving broadcast signals that transmit at least a plurality of wireless symbols;
detecting a potential leading edge of a correlator output associated with a first wireless symbol;
confirming leading edge detection by detecting a correlator output flat zone; and
detecting a trailing edge of the correlator output, wherein detecting the trailing edge comprises:
generating correlation outputs by correlating new signal samples with a delayed version thereof;
comparing each correlation output to a threshold; and
incrementing a counter when the correlation output is less than the threshold—otherwise setting the run counter equal to zero, wherein flat zone detection occurs when the second counter is greater than or equal to a predetermine value.

28. A computer implemented method of initial wireless symbol frame detection and coarse symbol timing acquisition comprising:
receiving a stream of broadcast input signals at least some being associated with a pilot symbol;
generating correlation outputs that form a correlation curve over time from the signals and delayed copies thereof;
detecting a leading edge of the correlation curve, wherein detecting the leading edge comprises:
comparing a correlation output to a threshold;
incrementing a counter if the output is greater than or equal to the threshold else setting the counter to zero; and
evaluating the counter to determine if it is equal to a predefined value;
detecting a flat zone portion of the correlation curve; and
detecting a trailing edge of the curve.

29. The method of claim 28, wherein the pilot symbol is an OFDM pilot symbol.

30. The method of claim 28, wherein detecting the flat zone comprises:
comparing the correlation output to a threshold;
incrementing a second counter when the correlation output is greater than or equal to the threshold; and
scrutinizing the counter value to determine if the value is greater than or equal to a predetermined value that is less than an expected value in an ideal environment.

31. The method of claim 30, further comprising updating a frequency loop periodically to account for signal frequency offset.

32. The, method of claim 30, wherein detecting the trailing edge comprises:
incrementing a third counter when the correlation value is less than the threshold otherwise setting the counter equal to zero; and
determining if and when the counter is equal to a predetermined value.

33. The method of claim 32, further comprising saving the time when the third counter is equal to zero.

34. A frame detection and synchronization system comprising:
a delayed correlator component that receives a stream of input samples, correlates an input samples with delayed versions thereof, and generates a plurality of outputs forming a correlation curve;
a leading edge component that receives the outputs, compares the outputs with a threshold, and generates a signal if it detects a potential leading edge of the correlation curve;
a confirmation component that, upon receipt of the signal from the leading edge component, compares additional outputs to the threshold to confirm that the leading edge was detected, wherein the leading edge component is configured to generate the signal when the output remains greater than or equal to the threshold for a predetermined number of consecutive samples; and
a trailing edge component that upon receipt of a signal from the confirmation component compares additional outputs to the threshold to locate the trailing edge of the correlation curve.

35. The system of claim 34, wherein the consecutive number of samples is 64.

36. A frame detection and synchronization system comprising:
a delayed correlator component that receives a stream of input samples, correlates an input samples with delayed versions thereof, and generates a plurality of outputs forming a correlation curve;
a leading edge component that receives the outputs, compares the outputs with a threshold, and generates a signal if it detects a potential leading edge of the correlation curve;
a confirmation component that, upon receipt of the signal from the leading edge component, compares additional Outputs to the threshold to confirm that the leading edge was detected, wherein the confirmation component comprises:
a hit counter that stores the number of times the output is greater than or equal to the threshold;
a run counter that stores the number of consecutive outputs that are less than the threshold; and
a processing component that receives the outputs, compares the outputs to a threshold and populates counters; and
a trailing edge component that upon receipt of a signal from the confirmation component compares additional outputs to the threshold to locate the trailing edge of the correlation curve.

37. The system of claim 36, wherein the run counter and the hit counter provide an indication that a leading edge was not detected.

38. system of claim 37, wherein the run counter has a value greater than or equal to 128, and the hit counter has a value less than 400.

39. The system of claim 36, wherein the run counter and the hit counter indicate that the leading edge component was slow to detect the leading edge.

40. The system of claim 39, wherein the run counter is greater than or equal to 768 and the hit counter is greater than 400.

41. The system of claim 36, further comprising an interval counter that stores the number of output values produced and analyzed.

42. The system of claim 41, wherein the interval counter in conjunction with the run counter indicate detection of a trailing edge of the correlation curve.

43. The system of claim 42, wherein the interval counter is greater than or equal to 4352 and the run counter is greater than zero.

44. The system of claim 41, further comprising a component that updates a frequency-locked loop every 128 outputs as indicated by the interval counter.

45. The system of claim 41, wherein the confirmation component is configured to save the time instance when the run counter is equal to zero.

46. A frame detection and synchronization system comprising:
a delayed correlator component that receives a stream of input samples, correlates an input samples with delayed versions thereof, and generates a plurality of outputs forming a correlation curve;
a leading edge component that receives the outputs, compares the outputs with a threshold, and generates a signal if it detects a potential leading edge of the correlation curve;
a confirmation component that, upon receipt of the signal from the leading edge component, compares additional outputs to the threshold to confirm that the leading edge was detected; and
a trailing edge component that upon receipt of a signal from the confirmation component compares additional outputs to the threshold to locate the trailing edge of the correlation curve, wherein the trailing edge component comprises:
a run counter that stores the number of consecutive times the correlation value is less than the threshold; and
a processor that receives correlation values, compares the correlation value with the threshold and increments the run count the value of which is indicative of trailing edge detection.

47. The system of claim 46, wherein the trailing edge component detects a trailing edge when the value of the run counter is 32.

48. The system of claim 46 further comprising an interval counter that is incremented each time a new correlation value is received, wherein the interval counter is employed to time out the search for the trailing edge.

49. The system of claim 48, further comprising a component that causes the search for the trailing edge to time out when the interval counter is greater than or equal to 8*128.

50. The system of claim 48, wherein the trailing edge component saves the time when run count is equal to zero.

51. A wireless apparatus comprising:
a receiver component that receives broadcast transmissions including a plurality of wireless symbol frames, at least one frame comprising a pilot symbol;
a frame detector component that identifies a start of a frame from detection of the pilot symbol, wherein the frame detector component comprising:
a leading edge component that detects a leading edge of a correlation curve based on a first programmable value, a threshold, and the correlator output;
a flat zone component that identifies a flat portion of the correlation curve based on a second programmable value, the threshold, and the correlator output; and
a trailing edge component that detects a trailing edge of the correlation curve based on third programmable value, the threshold, and correlator output; and
a correlator that generates output values from received signals and delayed versions thereof, the output values producing a correlation curve over time.

52. The apparatus of claim 51, wherein the wireless symbol frames are OFDM frames.

53. The apparatus of claim 51, wherein the pilot symbol is a TDM pilot symbol.

54. The apparatus of claim 51, wherein leading edge component is configured to detect a leading edge when the correlator output is greater than or equal to the threshold for a consecutive number of times equal to or greater than the first programmable value.

55. The apparatus of claim 54, wherein the fiat zone component is configured to detect a flat zone when the correlator output is greater than or equal to the threshold for a number of times greater than or equal to the second programmable value.

56. The apparatus of claim 55, wherein the trailing edge component is configured to detect the trailing edge when the correlator output is less than the threshold for a consecutive number of times equal to or greater than the third programmable value.

57. An initial frame detection system comprising:
a means for receiving a stream of signals at least a portion of which are associated with a pilot symbol;
a means for generating correlation outputs from the signals and delayed copies thereof; and
a means for detecting a leading edge, a fiat zone, and a trailing edge from the correlation outputs, wherein the means for detecting a leading edge comprises a means for comparing output values to a threshold the leading edge being detected when the output values are greater than the threshold for a first programmable number of consecutive times.

58. The system of claim 57, wherein the pilot symbol is a TDM pilot symbol.

59. The system of claim 57, wherein the means for detecting a flat zone comprises a means for comparing output values to the threshold, the flat zone being detected when the output values are greater than or equal to the threshold for a second programmable number of times.

60. The system of claim 59, further comprising a means to detect coarse frequency offset.

61. The system of claim 60, further comprising a means to save a time after flat zone detection and prior to initial detection of the trailing edge.

62. The system of claim 59, wherein the means for detecting a trailing edge comprises a means for comparing the output values to the threshold, the trailing edge being detected when the threshold is below the threshold for a third programmable number of times.

63. An apparatus for performing initial frame detection and synchronization, wherein the apparatus comprises:
a microprocessor that executes instruction to:
generate correlation metrics from signal samples and delayed copies thereof;
detect a leading edge, a flat zone, and a trailing edge by comparing the metrics to a threshold; and
update a frequency-locked loop to account for a frequency offset in conjunction with flat zone detection.

64. The apparatus of claim 63, wherein the leading edge is detected when the metric is greater than the threshold for a first predetermined number of consecutive times.

65. The apparatus of claim 64, wherein the flat zone is detected after leading edge detection when the metric is greater than the threshold for a second predetermined number of times.

66. The apparatus of claim 63, wherein the trailing edge is detected when the metric is less than the threshold for a third predetermined number of consecutive times.

67. An apparatus for performing initial frame detection and synchronization comprising:
a microprocessor that executes instruction to:
generate correlation metrics from signal samples and delayed copies thereof;
detect a leading edge, a flat zone, and a trailing edge by comparing the metrics to a threshold; and
save a time after detection of at least a portion of the flat zone and prior to initial trailing edge detection.

68. A system of frame detection and synchronization comprising:
a first component that receives a plurality of data packets comprising at least a pilot symbol;
a second component that generates correlation metrics from the data packets;
a third component that analyzes the metrics overtime to determine whether the pilot symbol has been received, the pilot symbol is received upon detection of metric values consistently less than a threshold for a first number of times, followed by a metric values greater than or equal to the threshold for a second number of times, followed by metric values consistently less than the threshold for a third number of times.

69. The system of claim 68, further comprising a forth component that accounts for frequency offset when the metric values are greater than or equal to the threshold.

70. The system of claim 69, wherein the third component saves a time after detection of metric values greater than or equal to the threshold and just prior to detection of metric values consistently less than the threshold.

71. A non-transitory computer readable medium having computer executable instructions stored thereon, which when executed by a machine cause the machine to perform operations comprising:
receiving a stream of input signals at least some being associated with a pilot symbol;
generating correlation outputs forming a correlation curve from the signals and delayed copies thereof;
detecting a potential leading edge of the correlation curve from correlation outputs, wherein the potential leading edge detection comprises:
comparing a correlation output to a threshold;
incrementing a counter if the output is greater than or equal to the threshold; and
analyzing the counter to determine if it is equal to a predefined value;
confirming leading edge detection from correlation outputs; and
detecting a trailing edge of the curve from correlation outputs.

72. The non-transitory computer readable medium of claim 71, wherein the predefined value is 64.

73. The non-transitory computer readable medium of claim 71, wherein confirming leading edge detection includes detecting a flat zone and/or a trailing edge.

74. The non-transitory computer readable medium of claim 71, having further computer executable instructions stored thereon, which when executed by the machine cause the machine to perform further operations comprising:
updating a frequency-locked loop periodically prior to detection of the trailing edge.

75. The non-transitory computer readable medium of claim 71, wherein the pilot symbol is a TDM symbol.

76. A non-transitory computer readable medium having computer executable instructions stored thereon, which when executed by a machine cause the machine to perform operations comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs, wherein confirming leading edge detection includes detecting a flat zone or a trailing edge, wherein the flat zone is detected by counting the number of times the correlator values are greater than or equal to a threshold; and
detecting a trailing edge of the curve from correlation outputs.

77. A non-transitory computer readable medium having computer executable instructions stored thereon, which when executed by a machine cause the machine to perform operations comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs, wherein confirming leading edge detection includes detecting a flat zone or a trailing edge; and
detecting a trailing edge of the curve from correlation outputs, wherein the trailing edge is detected by counting the number of times the correlator output is less than a threshold.

78. A non-transitory computer readable medium having computer executable instructions stored thereon, which when executed by a machine cause the machine to perform operations comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs, wherein confirming detection of the leading edge comprises:
incrementing a first counter if the correlation value is greater than or equal to a threshold;
incrementing a second counter if the correlation value is less than the threshold otherwise setting the second counter equal to zero; and
examining the values of the first and second counters to decipher what is being received; and
detecting a trailing edge of the curve from correlation outputs.

79. The non-transitory computer readable medium of claim 78, wherein a false leading edge is detected when the first counter is substantially equal to the second counter.

80. The non-transitory computer readable medium of claim 78, having further computer executable instructions stored thereon, which when executed by the machine cause the machine to perform further operations comprising:

saving a time for use by a fine timing algorithm when the second counter is equal to zero.

81. The non-transitory computer readable medium of claim 78, having further computer executable instructions stored thereon, which when executed by the machine cause the machine to perform further operations comprising:
incrementing a third counter for each new sample received and correlated.

82. The non-transitory computer readable medium of claim 81, wherein the beginning of the trailing edge is observed when the third counter indicates that an entire flat zone should have been received and the second counter is greater than zero.

83. The non-transitory computer readable medium of claim 78, having further computer executable instructions stored thereon, which when executed by the machine cause the machine to perform further operations comprising:
requiring the first counter value to be greater than or equal to half the number of what it would be without the tempering effect of noise prior to declaring detection of a flat zone or a trailing edge.

84. A non-transitory computer readable medium having computer executable instructions stored thereon, which when executed by a machine cause the machine to perform operations comprising:
receiving a stream of input signals at least some being associated with a pilot symbol;
generating correlation outputs forming a correlation curve from the signals and delayed copies thereof;
detecting a potential leading edge of the correlation curve from correlation outputs;
confirming leading edge detection from correlation outputs; and
detecting a trailing edge of the curve from correlation outputs, wherein detecting the trailing edge comprises:
incrementing a first counter when the correlation value is less than a threshold, otherwise setting the first counter equal to zero; and
determining when the first counter is equal to a predetermined value.

85. The non-transitory computer readable medium of claim 84, wherein the predetermined value is 32.

86. The non-transitory computer readable medium of claim 84, having further computer executable instructions stored thereon, which when executed by the machine cause the machine to perform further operations comprising:
saving a time, when the first counter is equal to zero, for use by a fine timing algorithm.

87. The non-transitory computer readable medium of claim 84, having further computer executable instructions stored thereon, which when executed by the machine cause the machine to perform further operations comprising:
incrementing a second counter for every sample received to facilitate timing out a trailing edge detection process after a predetermined number of samples.

88. A non-transitory computer readable medium having computer executable instructions stored thereon, which when executed by a machine cause the machine to perform operations comprising:
receiving broadcast signals that transmit at least a plurality of wireless symbols;
detecting a potential leading edge of a correlator output associated with a first wireless symbol, wherein the potential leading edge is detected by analyzing output of a delayed correlator to determine if the output exceeds a threshold for a predetermined number of consecutive times;
confirming leading edge detection by detecting a correlator output flat zone; and
detecting a trailing edge of the correlator output.

89. The non-transitory computer readable medium of claim 88, wherein the wireless symbols are OFDM symbols.

90. The non-transitory computer readable medium of claim 88, wherein the first wireless symbol is a TDM pilot symbol.

91. A non-transitory computer readable medium having computer executable instructions stored thereon, which when executed by a machine cause the machine to perform operations comprising:
receiving broadcast signals that transmit at least a plurality of wireless symbols;
detecting a potential leading edge of a correlator output associated with a first wireless symbol;
confirming leading edge detection by detecting a correlator output flat zone;
detecting a trailing edge of the correlator output; and
updating a frequency loop periodically during observation of the flat zone.

92. The non-transitory computer readable medium of claim 91, having further computer executable instructions stored thereon, which when executed by the machine cause the machine to perform further operations comprising:
saving a time instance prior just prior to detection of a trailing edge, wherein the time instance is related to a specific number of samples into a second wireless symbol.

93. The non-transitory computer readable medium of claim 92, wherein the second wireless symbol is a TDM pilot symbol.

94. The non-transitory computer readable medium of claim 92, having further computer executable instructions stored thereon, which when executed by the machine cause the machine to perform further operations comprising:
switching the frequency loop to tracking mode.

95. The non-transitory computer readable medium of claim 94, having further computer executable instructions stored thereon, which when executed by the machine cause the machine to perform further operations comprising:
acquiring fine timing utilizing the second wireless symbol and the saved time instance.

96. A non-transitory computer readable medium having computer executable instructions stored thereon, which when executed by a machine cause the machine to perform operations comprising:
receiving broadcast signals that transmit at least a plurality of wireless symbols;
detecting a potential leading edge of a correlator output associated with a first wireless symbol;
confirming leading edge detection by detecting a correlator output flat zone, wherein detecting the flat zone comprises:
generating correlation outputs by correlating new signal samples with a delayed version thereof;
comparing the correlation output to a threshold; and
incrementing a counter when the correlation output is greater than or equal to the threshold, wherein the flat zone is detected when the counter value is at least half of the value that would be detected in an ideal environment; and
detecting a trailing edge of the correlator output.

97. A non-transitory computer readable medium having computer executable instructions stored thereon, which when executed by a machine cause the machine to perform operations comprising:

receiving broadcast signals that transmit at least a plurality of wireless symbols;
detecting a potential leading edge of a correlator output associated with a first wireless symbol;
confirming leading edge detection by detecting a correlator output flat zone; and
detecting a trailing edge of the correlator output, wherein detecting the trailing edge comprises:
 generating correlation outputs by correlating new signal samples with a delayed version thereof;
 comparing each correlation output to a threshold; and
 incrementing a counter when the correlation output is less than the threshold otherwise setting the run counter equal to zero, wherein flat zone detection occurs when the second counter is greater than or equal to a predetermine value.

98. A non-transitory computer readable medium having computer executable instructions stored thereon, which when executed by a machine cause the machine to perform operations comprising:
receiving a stream of broadcast input signals at least some being associated with a pilot symbol;
generating correlation outputs that form a correlation curve over time from the signals and delayed copies thereof;
detecting a leading edge of the correlation curve, wherein detecting the leading edge comprises:
 comparing a correlation output to a threshold;
 incrementing a counter if the output is greater than or equal to the threshold else setting the counter to zero; and
 evaluating the counter to determine if it is equal to a predefined value;
detecting a flat zone portion of the correlation curve; and
detecting a trailing edge of the curve.

99. The non-transitory computer readable medium of claim 98, wherein the pilot symbol is an OFDM pilot symbol.

100. The non-transitory computer readable medium of claim 98, wherein detecting the flat zone comprises:
comparing the correlation output to a threshold;
incrementing a second counter when the correlation output is greater than or equal to the threshold; and
scrutinizing the counter value to determine if the value is greater than or equal to a predetermined value that is less than an expected value in an ideal environment.

101. The non-transitory computer readable medium of claim 100, having further computer executable instructions stored thereon, which when executed by the machine cause the machine to perform further operations comprising:
updating a frequency loop periodically to account for signal frequency offset.

102. The non-transitory computer readable medium of claim 100, wherein detecting the trailing edge comprises:
incrementing a third counter when the correlation value is less than the threshold otherwise setting the counter equal to zero; and
determining if and when the counter is equal to a predetermined value.

103. The non-transitory computer readable medium of claim 102, having further computer executable instructions stored thereon, which when executed by the machine cause the machine to perform further operations comprising:
saving the time when the third counter is equal to zero.

* * * * *